United States Patent [19]
Yamaguchi et al.

[11] Patent Number: 5,734,001
[45] Date of Patent: Mar. 31, 1998

[54] FLUOROSILICONE COMPOUND AND COMPOSITION CONTAINING THE SAME

[75] Inventors: Fumihiko Yamaguchi; Tatsuya Otsuka; Masayuki Yamana; Masato Kashiwagi; Hirotoshi Sakashita, all of Settsu, Japan

[73] Assignee: Daikin Industries, Ltd., Osaka, Japan

[21] Appl. No.: 737,498

[22] PCT Filed: May 25, 1995

[86] PCT No.: PCT/JP95/01008

§ 371 Date: Nov. 20, 1996

§ 102(e) Date: Nov. 20, 1996

[87] PCT Pub. No.: WO95/33001

PCT Pub. Date: Dec. 7, 1995

[30] Foreign Application Priority Data

May 30, 1994 [JP] Japan ................................ 6-117263

[51] Int. Cl.$^6$ ........................................... C08G 77/24
[52] U.S. Cl. ........................ 528/42; 528/13; 528/16; 528/18; 528/19; 528/21; 528/25; 528/29; 528/40; 528/43
[58] Field of Search ........................ 528/42, 29, 40, 528/25, 13, 16, 19, 18, 21, 43

[56] References Cited

FOREIGN PATENT DOCUMENTS

| 0469928 | 2/1992 | European Pat. Off. . |
| 5-247214 | 9/1993 | Japan . |

OTHER PUBLICATIONS

International Search Report in PCT/JP95/01008 mailed Sep. 5, 1995.

*Primary Examiner*—Melvyn I. Marquis
*Attorney, Agent, or Firm*—Varndell Legal Group

[57] ABSTRACT

A novel fluorosilicone compound having at least two hydroxyl groups in its molecule and a curable composition containing such a compound and a commercially available general purpose curing agent; the compound is used suitably for a lubricant and a fiber treating agent, and the curable composition is used suitably for a mold releasing agent, a water- and oil-repelling agent, a stain-proof coating agent, a non-tackifying coating agent, a coating agent for optical use and a sealant.

20 Claims, No Drawings

FLUOROSILICONE COMPOUND AND COMPOSITION CONTAINING THE SAME

TECHNICAL FIELD

The present invention relates to a novel fluorosilicone compound and a novel curable fluorosilicone composition. Particularly the present invention relates to a lubricant, fiber treating agent, mold releasing agent, water- and oil-repelling agent, stain-proof coating agent, non-tackifying coating agent, coating agent for optical use, and sealant, which contain the above-mentioned fluorosilicone compound or composition.

BACKGROUND ART

A curable composition comprising a silicone polymer as a major component exhibits water- and oil-repelling property and mold-releasing property because of its low surface tension, and a number of such compositions have been known. Among them, the use of a fluorosilicone polymer has been studied in order to further enhance water- and oil-repelling property and mold releasing property.

For example, "Silicone Handbood" (Nikkan Kogyo Shimbunsha (1990)) discloses at pages 559 to 592, fluorosilicone polymers containing the structures shown below:

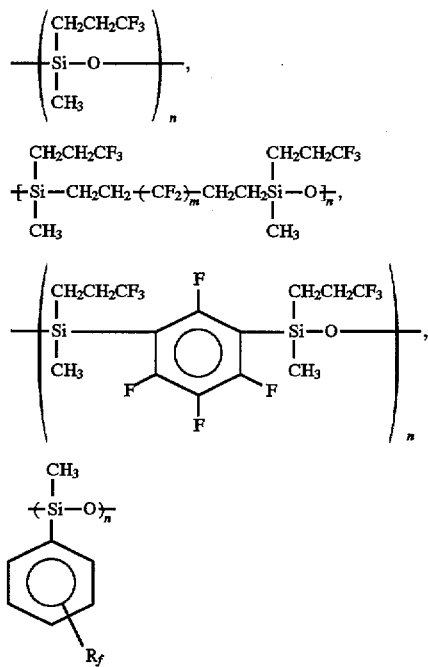

and the like. However, curable compositions containing those fluorosilicone polymers do not have sufficient properties such as water-repelling property and oil-repelling property. Also, the production of those fluorosilicone polymers requires complicated and costly process steps.

Also JP-A-301963/1993 and JP-A-302034/1993 disclose curable fluorosilicone polymer compositions having high water- and oil-repelling property, but unless a specific fluorine-containing compound is used as a curing agent, compatibility with the fluorosilicone polymer is not good and curing is insufficient, and thus, satisfactory characteristics cannot be obtained.

On the other hand, when the above-mentioned specific curing agent is used, the obtained composition becomes costly.

Also though studies have been made to enhance water-repelling property, oil-repelling property, mold releasing property and the like by adding a silane coupling agent having a perfluoroalkyl group to the curable silicone compounds, compatibility and is worse and uniformly cured film cannot be obtained, and in case where compatibility is good, water-repelling property, oil-repelling property and mold releasing property of the resulting cured film are insufficient and not satisfactory.

The conventional curable fluorosilicone polymer compositions have the drawbacks as mentioned above, and therefore their applications are limited.

An object of the present invention is to provide a curable polysiloxane composition which does not have the above-mentioned drawbacks, that is, a curable fluorosilicone polymer composition which can use a usual general-purpose curing agent and therefore is inexpensive, and can form a cured film having a low surface tension (high water-repelling property, high oil-repelling property, non-tackiness, and the like) after cured, and to provide a novel fluorosilicone compound which is a major component of the above-mentioned composition.

Further the present invention can provide various applications of the curable fluorosilicone polymer composition containing the novel fluorosilicone compound.

DISCLOSURE OF THE INVENTION

Namely, the present invention relates to a fluorosilicone compound having at least two hydroxyl groups in its molecule and represented by the formula (I):

$$R_f-R^1-X-R^2-(SiO)_a-Si-R^2-X-R^1-R_f \quad \text{(I)}$$
with $R^3, R^4$ substituents on Si

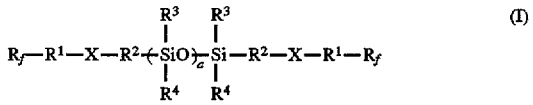

wherein $R_f$ is a perfluoroalkyl group having 4 to 20 carbon atoms, and a part of fluorine atoms may be replaced by chlorine atom, hydrogen atom or the both of them; $R^1$ is an alkylene group having 1 to 5 carbon atoms or a hydroxyalkylene group having 2 to 5 carbon atoms; $R^2$ is an alkylene group having 1 to 12 carbon atoms, an oxyalkylene group having 2 to 50 carbon atoms or a hydroxyalkylene group having 3 to 15 carbon atoms; $R^3$ and $R^4$ are the same or different and each is at least one of an alkyl having 1 to 4 carbon atoms, phenyl or a fluoroalkyl group having 1 to 3 carbon atoms; X is oxygen atom, sulfur atom, NH or $CO_2$; a is an integer of 5 to 1,000; provided that at least one of $R^1$ or $R^2$ is the above-mentioned hydroxyalkylene group (hereinafter referred to as "fluorosilicone compound (I)").

Also the present invention relates to a fluorosilicone compound represented by the formula (II):

$$R^5-(SiO)_y-(SiO)_x-Si-R^5 \quad \text{(II)}$$
with substituents $R^3, R^6, R^3, R^4, R^2-X-R^1-R_f, R^4$ wherein $R_f$ is a perfluoroalkyl group having 4 to 20 carbon atoms and a part of fluorine atoms may be replaced by chlorine atom, hydrogen atom or the both of them; $R^1$ is an alkylene group having 1 to 5 carbon atoms or a hydroxyalkylene group having 2 to 5 carbon atoms; $R^2$ is an alkylene group having 1 to 12 carbon atoms, an oxyalkylene group having 2 to 50 carbon atoms or a hydroxyalkylene group having 3 to 15 carbon atoms; $R^3, R^4, R^5$ and $R^6$ are the same or different and each is at least one of an alkyl having 1 to 4 carbon atoms, phenyl or a fluoroalkyl group having 1 to 3 carbon atoms; X is oxygen atom, sulfur atom, NH or $CO_2$; both of y and z are an integer, the sum of them is an integer of 5 to 1,000 and y/z is in the range of 0.5 to 200; provided that z is not less than 2 and at least one of $R^1$ or $R^2$ is the above-mentioned hydroxyalkylene group (hereinafter referred to as "fluorosilicone compound (II)").

Further the present invention relates to a curable fluorosilicone composition containing one or more of the above-mentioned fluorosilicone compounds (I) and one or more of the compounds represented by the formula (III):

$$(R^7)_a SiZ_{4-a} \quad (III)$$

wherein $R^7$ is an alkyl, a fluoroalkyl group, an alkenyl or phenyl, a is 0 or 1, Z is one or more of halogen atom, an alkoxyl group, an acyloxyl group, a ketoxime group, an alkenyloxy group, an amino group or an amido group (hereinafter referred to as "curable fluorosilicone composition (I)").

Furthermore, the present invention relates to a curable fluorosilicone composition containing one or more of the above-mentioned fluorosilicone compounds (II) and one or more of the above-mentioned compounds represented by the formula (III) (hereinafter referred to as "curable fluorosilicone composition (II)").

Furthermore the present invention relates to a lubricant and a fiber treating agent which contain the above-mentioned fluorosilicone compound (I) or (II).

Furthermore the present invention relates to a mold releasing agent, water- and oil-repelling agent, stain-proof coating agent, non-tackifying coating agent, coating agent for optical use and sealant, which contain the above-mentioned fluorosilicone composition (I) or (II).

BEST MODE FOR CARRYING OUT THE INVENTION

The fluorosilicone compound (I) of the present invention is represented by the above-mentioned formula (I). In the formula (I), examples of preferable $R_f$ are, for instance, F—$(CF_2)_b$— (b=integer of 4 to 20), $(CF_3)_2CF$—$(CF_2)_c$— (c=integer of 2 to 16) and H—$(CF_2)_d$— (d=integer of 4 to 20). Examples thereof are, for instance, F—$(CF_2)_6$—, F$(CF_2)_8$—, F$(CF_2)_{10}$—, F$(CF_2)_{12}$—, F$(CF_2)_{14}$—, F$(CF_2)_{16}$—, F$(CF_2)_{18}$—, F$(CF_2)_{20}$—, $(CF_3)_2CF$—$(CF_2)_2$—, $(CF_3)_2CF$—$(CF_2)_4$—, $(CF_3)_2CF$—$(CF_2)_6$—, $(CF_3)_2CF$—$(CF_2)_8$—, $(CF_3)_2CF$—$(CF_2)_{10}$—, $(CF_3)_2CF$—$(CF_2)_{12}$—, $(CF_3)_2CF$—$(CF_2)_{14}$—, $(CF_3)_2CF$—$(CF_2)_{16}$—, H—$(CF_2)_6$—, H—$(CF_2)_8$—, H—$(CF_2)_{10}$—, H—$(CF_2)_{12}$—, H—$(CF_2)_{14}$—, H—$(CF_2)_{16}$—, H—$(CF_2)_{18}$—, H—$(CF_2)_{20}$— and the like.

Examples of $R^1$ are, for instance, an alkylene group of —$(CH_2)_e$— (e=integer of 1 to 5) and a hydroxyalkylene group such as;

—CH$_2$CHCH$_2$—, —CH$_2$—CH—,
    |                   |
   OH            CH$_2$OH

—CH$_2$OCH$_2$CHCH$_2$— and —CH$_2$OCH$_2$CH—.
            |                         |
         OH                       CH$_2$OH Examples of preferable $R^2$ are, for instance, a divalent organic group having an group such as —$(CH_2)_f$— (f=integer of 1 to 12) or

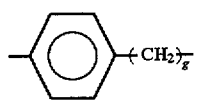

(g=integer of 1 to 5); an oxyalkylene group such as

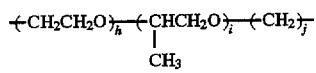

(h is 0 or an integer of 1 to 15, i is 0 or an integer of 1 to 15, j is an integer of 1 to 10); and a hydroxyalkylene group such as

  (k is an integer of 1 to 5),

  (m is an integer of 1 to 5), and

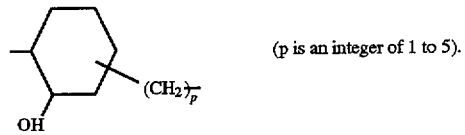  (p is an integer of 1 to 5).

Examples thereof are, for instance,

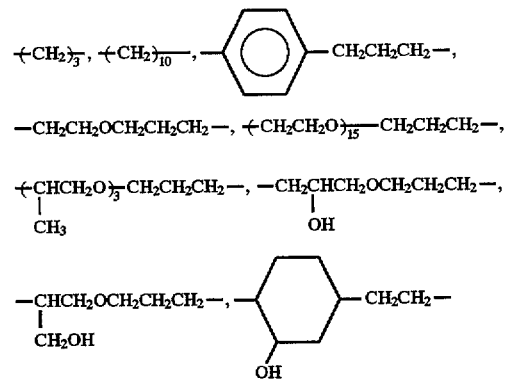

and the like.

$R^3$ and $R^4$ may be the same or different, and preferable are, for instance, an alkyl having 1 to 4 carbon atoms; phenyl; and a fluoroalkyl group having 1 to 3 carbon atoms. Examples thereof are, for instance, an alkyl such as methyl, ethyl, propyl or butyl, a fluoroalkyl group such as $CF_3CH_2CH_2$—, and the like.

Examples of preferable X are oxygen atom, sulfur atom, —NH— and $CO_2$.

The a is an integer of 5 to 1,000, and preferably is from 10 to 500, particularly preferably from 15 to 300 from the viewpoint of low surface energy characteristics such as water-repelling property, oil-repelling property and mold releasing property and the viewpoint of durability of a cured film.

Examples of preferable fluorosilicone compound (I) are, for instance,

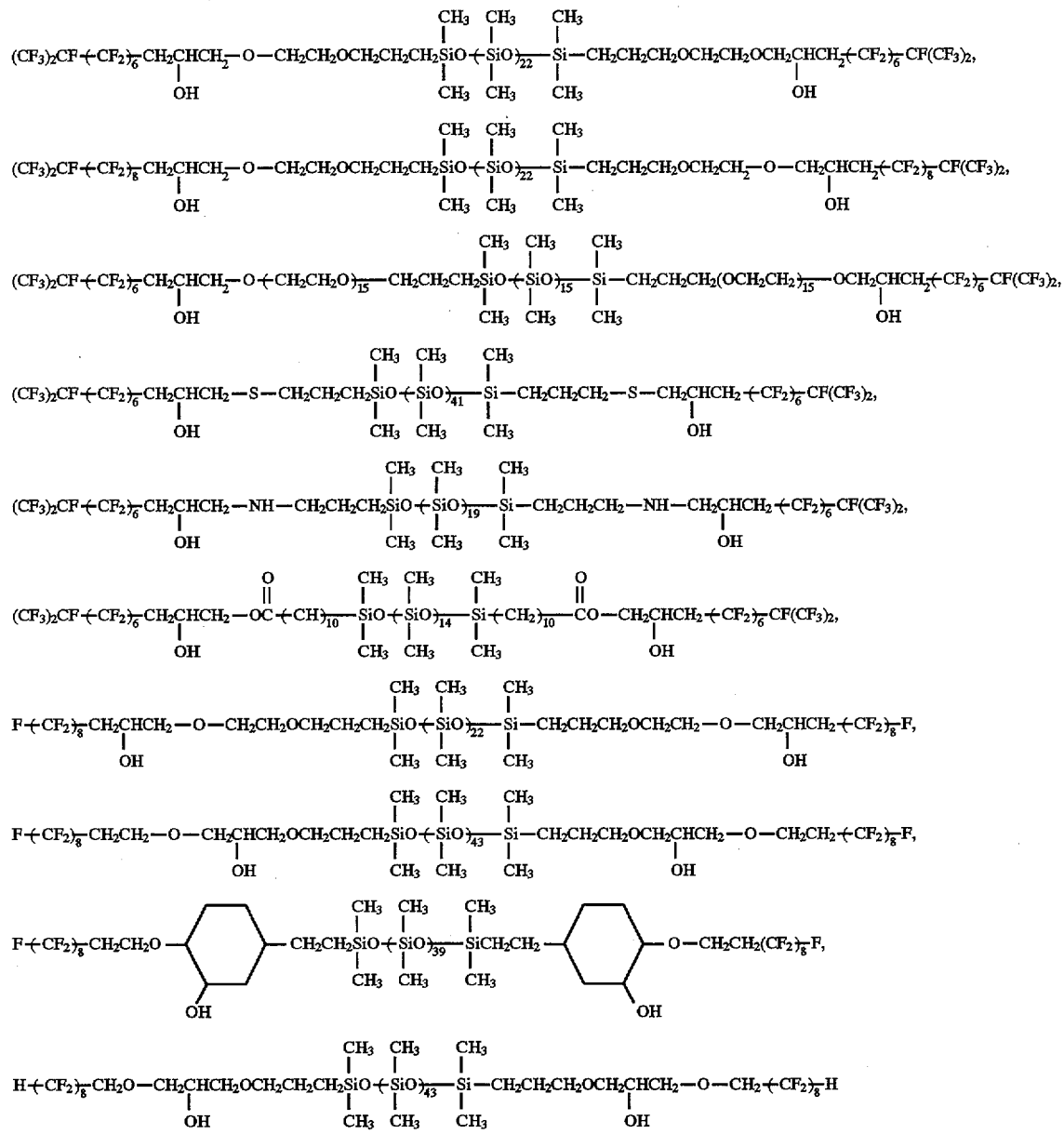

and the like.

The fluorosilicone compound (II) of the present invention is represented by the above-mentioned formula (II). In the formula (II), as the preferable $R_f$, there are, for example, F—$(CF_2)_b$— (b is an integer of 4 to 20), $(CF_3)_2CF$—$(CF_2)_c$— (c is an integer of 2 to 16) and H—$(CF_2)_d$— (d is an integer of 4 to 20). Examples thereof are, for instance, F—$(CF_2)_6$—, F$(CF_2)_8$—, F$(CF_2)_{10}$—, F$(CF_2)_{12}$—, F$(CF_2)_{14}$—, F$(CF_2)_{16}$—, F$(CF_2)_{18}$—, F$(CF_2)_{20}$—, $(CF_3)_2$CF—$(CF_2)_2$—, $(CF_3)_2$CF—$(CF_2)_4$—, $(CF_3)_2$CF—$(CF_2)_6$—, $(CF_3)_2$CF—$(CF_2)_8$—, $(CF_3)_2$CF—$(CF_2)_{10}$—, $(CF_3)_2$CF—$(CF_2)_{12}$—, $(CF_3)_2$CF—$(CF_2)_{14}$—, $(CF_3)_2$CF—$(CF_2)_{16}$—, H—$(CF_2)_6$—, H—$(CF_2)_8$—, H—$(CF_2)_{10}$—, H—$(CF_2)_{12}$—, H—$(CF_2)_{14}$—, H—$(CF_2)_{16}$—, H—$(CF_2)_{18}$—, H—$(CF_2)_{20}$— and the like.

Examples of $R^1$ are, for instance, an alkylene group of —$(CH_2)_e$— (e is an integer of 1 to 5); and a hydroxyalkylene group such as

—CH$_2$CHCH$_2$—, —CH$_2$—CH— ,
     |               |
     OH          CH$_2$OH

—CH$_2$OCH$_2$CHCH$_2$— and —CH$_2$OCH$_2$CH— .
            |                       |
            OH                    CH$_2$OH Examples of preferable $R^2$ are, for instance, a divalent organic group having an alkylene group such as —$(CH_2)_f$— (f=integer of 1 to 12) or

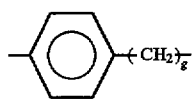

g=integer of 1 to 5); an oxyalkylene group such as

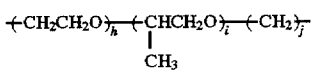

(h is 0 or an integer of 1 to 15, i is 0 or an integer of 1 to 15, j is an integer of 1 to 10); and a hydroxyalkylene group such as

 (k is an integer of 1 to 5),

 (m is an integer of 1 to 5), and

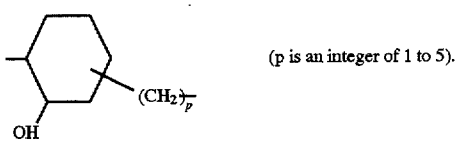 (p is an integer of 1 to 5).

Examples thereof are, for instance,

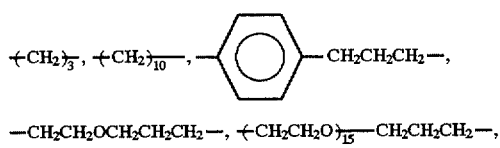

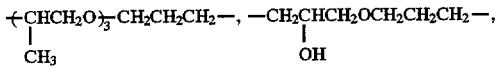

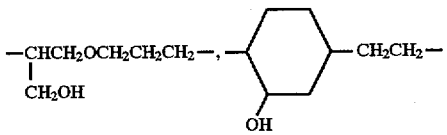

and the like.

$R^3$, $R^4$, $R^5$ and $R^6$ may be the same or different, and preferable are, for instance, an alkyl having 1 to 4 carbon atoms; phenyl; and a fluoroalkyl group having 1 to carbon atoms. Examples thereof are, for instance, an alkyl such as methyl, ethyl, propyl or butyl, a fluoroalkyl group such as $CF_3CH_2CH_2$—, and the like.

Example of preferable X is oxygen atom, sulfur atom, —NH— or $CO_2$.

Both of y and z are an integer, and the sum of them is an integer of 5 to 1,000, preferably 10 to 500. The ratio of y/z is in the range of 0.5 to 200, preferably to 100, and z is not less than 2. At least one of $R^1$ and $R^2$ is a hydroxyalkylene group.

Examples of preferable fluorosilicone compound (II) are, for instance,

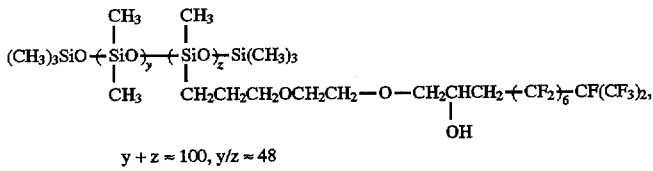

y + z = 100, y/z = 48

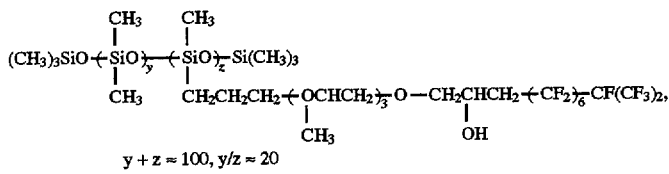

y + z = 100, y/z = 20

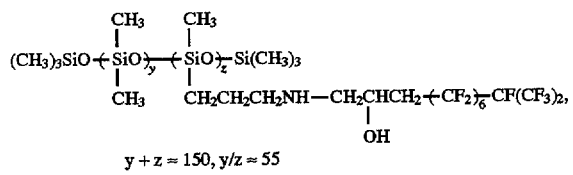

y + z = 150, y/z = 55

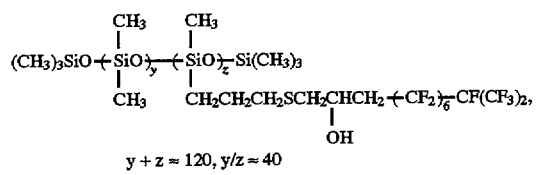

y + z = 120, y/z = 40

-continued

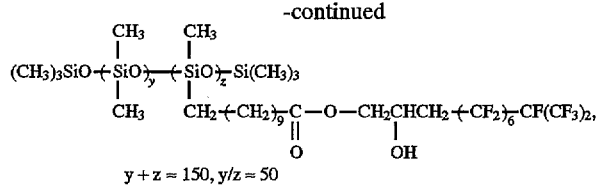
y + z ≈ 150, y/z ≈ 50

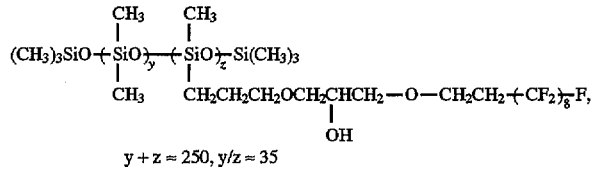
y + z ≈ 250, y/z ≈ 35

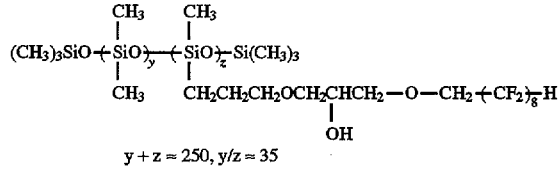
y + z ≈ 250, y/z ≈ 35 and the like.

The fluorosilicone compound (I) can be prepared, for example, by reacting a compound represented by the formula (IV):

$$H-X-R^2-(SiO)_a-Si-R^2-X-H$$ (IV)

with R³, R⁴ substituents as shown, wherein $R^2$, $R^3$, $R^4$ X and (a) are the same as above, with a compound represented by the formula (V):

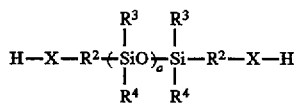
(V)

wherein $R_f$ is the same as above, $R^3$ is —CH$_2$—, —CH$_2$OCH$_2$— or —CH$_2$CH$_2$OCH$_2$—, in the presence or absence of a catalyst.

Examples of the compound (IV) are, for instance,

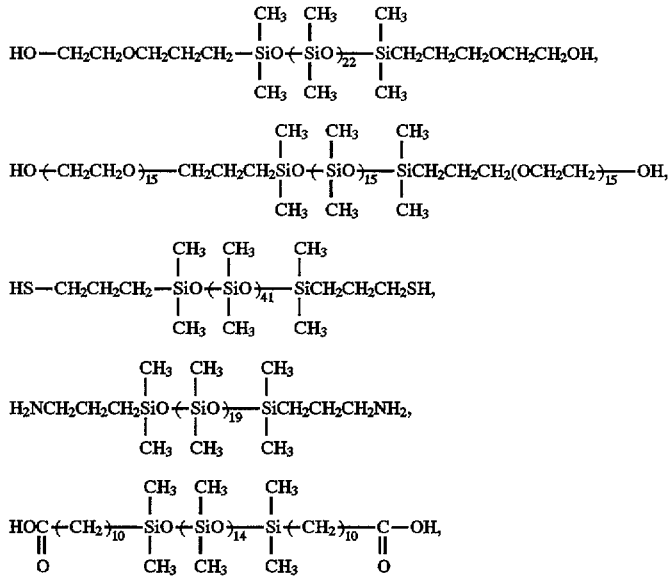

and the like.

Examples of the compound (V) are, for instance,

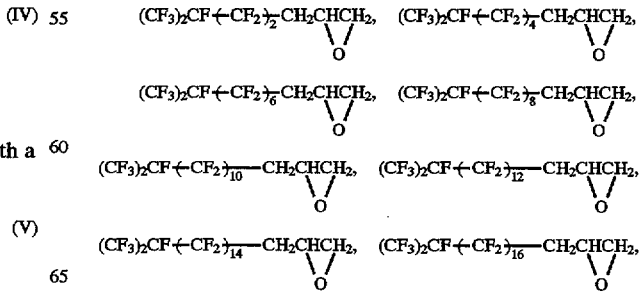

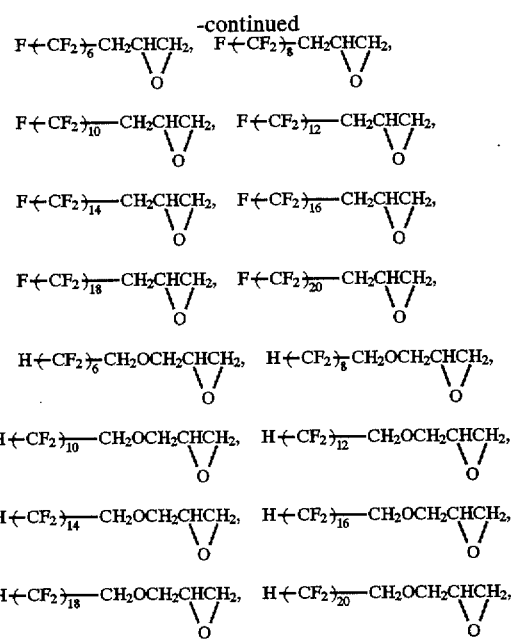

and the like.

The fluorosilicone compound (II) can be prepared, for example, by reacting a compound represented by the formula (VI):

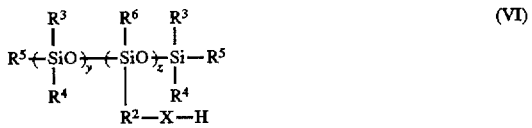

wherein $R^2$, $R^3$, $R^4$, $R^5$, $R^6$, X, y and z are the same as above, with the compound represented by the formula (V) in the presence or absence of a catalyst.

Examples of the compound (VI) are, for instance,

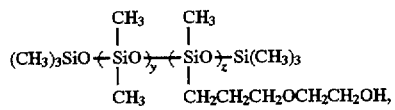
y + z = 100, y/z = 48

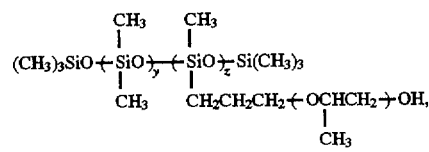
y + z = 100, y/z = 20

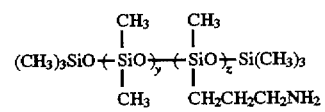
y + z = 150, y/z = 55

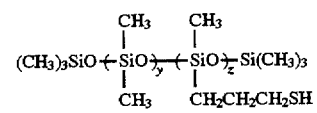
y + z = 120, y/z = 40

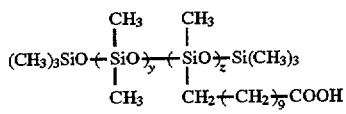
y + z = 150, y/z = 50 and the like.

In any one of the above-mentioned reactions, as the catalyst, there can be used, for example, an ether complex of $BF_3$, a Lewis acid such as $ZnCl_2$, $AlCl_3$ or $SnCl_4$, an ammonia salt such as trimethylbenzylammonium chloride and the like. The reaction temperature is from 0° to 200° C., preferably from 40° to 150° C. For the reaction, a reaction medium may be used. As the reaction medium, there may be used one which dissolves each reaction component and does not inhibit the reaction. Examples of the medium are, for instance, $CH_2Cl_2$, $CHCl_3$, acetone, ethyl acetate, diethyl ether, toluene, dichlorofluoroethane (HCFC-141b) and the like.

The above-mentioned fluorosilicone compound (I) or (II) can also be prepared by reacting an epoxy-containing silicone compound represented by the formula (VII):

wherein A is

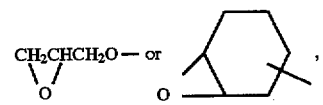

$R^9$ is an alkylene group having 1 to 12 carbon atoms or an oxyalkylene group having 2 to 50 carbon atoms, $R^3$, $R^4$ and a are the same as above, or an epoxy-containing silicone compound represented by the formula (VIII):

wherein $R^3$, $R^4$, $R^5$, $R^6$, $R^9$, A, y and z are the same as above, with a compound represented by the formula (IX):

wherein $R_f$ is the same as above, $R^{10}$ is an alkylene group having 1 to 5 carbon atoms.

Examples of the compound (VII) are, for instance,

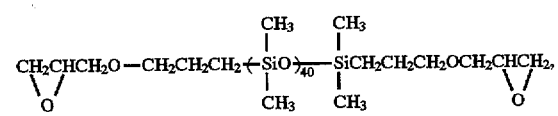

-continued

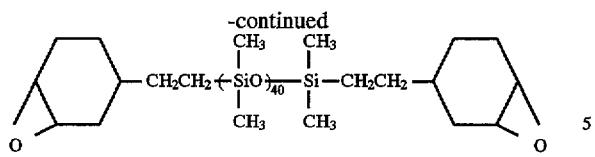

and the like.

Examples of the compound (HH) for instance,

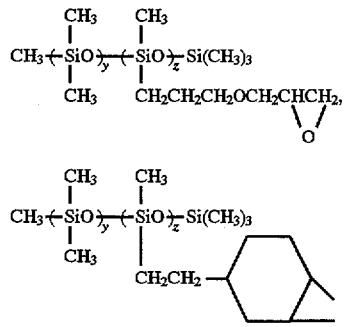

and the like.

Examples of the compound (IX) are, for instance, $(CF_3)_2CF\text{—}(CF_2)_4\text{—}CH_2CH_2OH$, $(CF_3)_2CF\text{—}(CF_2)_6\text{—}CH_2CH_2OH$, $(CF_3)_2CF\text{—}(CF_2)_8\text{—}CH_2CH_2OH$, $(CF_3)_2CF\text{—}(CF_2)_{10}\text{—}CH_2CH_2OH$, $F\text{—}(CF_2)_6\text{—}CH_2CH_2OH$, $F\text{—}(CF_2)_8\text{—}CH_2CH_2OH$, $F\text{—}(CF_2)_{10}\text{—}CH_2CH_2OH$, $H\text{—}(CF_2)_4\text{—}CH_2OH$, $H\text{—}(CF_2)_6\text{—}CH_2OH$, $H\text{—}(CF_2)_8\text{—}CH_2OH$, $H\text{—}(CF_2)_{10}\text{—}CH_2OH$ and the like.

The reaction can be carried out under the same conditions as in the reaction of (IV) or (VI) with (V).

The fluorosilicone compounds (I) and (II) of the present invention are useful as a lubricant or a fiber treating agent when used solely or in combination with a proper additive or a solvent.

The present invention also relates to the curable fluorosilicone composition (I) or (II) comprising the fluorosilicone compound (I) or (II) and the compound of the formula (III).

The compound of the formula (III) is a curing agent. In the formula (III), $R^7$ is preferably an alkyl having 1 to 20 carbon atoms such as methyl, ethyl or propyl; a fluoroalkyl group having 1 to 20 carbon atoms such as $CF_3CH_2CH_2\text{—}$, $F\text{—}(CF_2)_2\text{—}CH_2CH_2\text{—}$ or $F\text{—}(CF_2)_8CH_2CH_2\text{—}$; an alkenyl group having 2 to 5 carbon atoms such as $CH_2\text{=}CH\text{—}$ or $CH_2\text{=}CHCH_2\text{—}$; or phenyl, Z is a hydrolyzable group and is preferably halogen atom such as Cl or Br; an alkoxyl group having 1 to 5 carbon atoms such as $CH_3O\text{—}$, $C_2H_5O\text{—}$ or $(CH_3)_2CHO\text{—}$ or a phenoxy group; an acyloxyl group having 2 to 5 carbon atoms such as $CH_3COO\text{—}$ or $CH_3CH_2COO\text{—}$; a ketoxime group having 3 to 8 carbon atoms such as

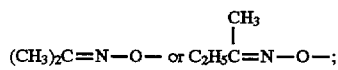

an alkenyloxy group having 3 to 15 carbon atoms such as

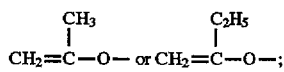

an amino group such as

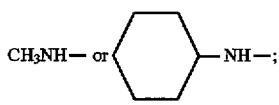

an amido group such as

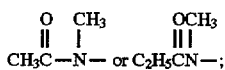

or the like. The ketoxime group is more preferable from the viewpoints of a curing speed and storage stability and from a point that starting materials are easily available.

Examples of the preferred compound (III) are, for instance,

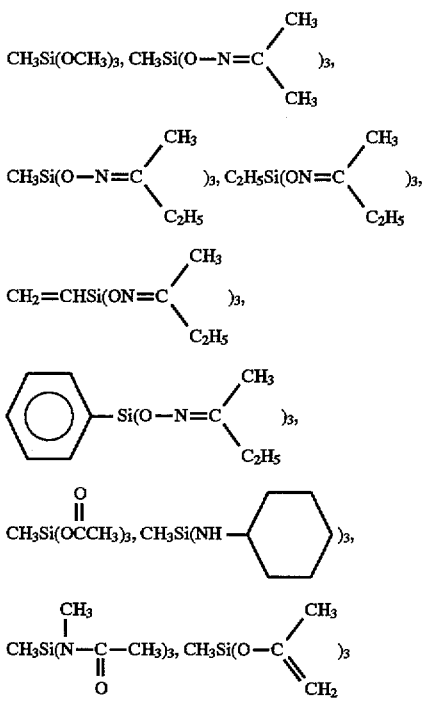

and the like.

To the fluorosilicone compounds (I) and (II) of the present invention can be added various additives, for example, an electric conductivity imparting agent, filler, colorant, adhesivity imparting agent, thermal stabilizer, ultraviolet ray absorber and the like. Also the compounds (I) and (II) can be used solely, and may be diluted with solvent such as aliphatic hydrocarbon, alicyclic hydrocarbon, aromatic hydrocarbon, halogenated hydrocarbon, polysiloxane compound, ketone compound or ester compound. The present invention is not limited to such solvents.

The above-mentioned fluorosilicone compounds (I) and (II) are used solely and in combination use of a proper additive or a solvent, and thereby is useful, for example, as a lubricant excellent in lubricity and solvent resistance or as a fiber treating agent excellent in water- and oil-repelling property and softening property.

To the curable fluorosilicone compositions (I) and (II) of the present invention can be added various additives, for example, a curing accelerator such as metal alkoxides, e.g. tetraalkyl titanate, tetraalkyl germanate, tetraalkyl zirconate or vanadium trialkoxide, or organic acid salts, e.g. zinc octylate, ferric octylate or tin octylate; an electric conductivity imparting agent such as carbon black, metal, e.g. Ag or Cu or metal oxide, e.g. $TiO_2$; a filler for increasing hardness and strength such as silica, mica, talc, clay, diatom earth or calcium carbonate; a colorant such as pigment or dye; an adhesivity imparting agent such as silane coupling agent or titanate coupling agent; a thermal stabilizer such as red iron oxide, titanium oxide, cerium oxide or barium zirconate; an ultraviolet ray absorber such as benzotriazole or benzophenone derivative; and the like. Also the above-mentioned compositions (I) and (II) can be used solely and may be diluted with solvent such as aliphatic hydrocarbon e.g. hexane, heptane or octane; alicyclic hydrocarbon e.g. cyclohexane; aromatic hydrocarbon e.g. benzene, toluene or xylene; halogenated hydrocarbon e.g. dichloromethane, chloroform, trichloroethane, trichlorotrifluoroethane or dichloromonofluoroethane (HCFC-141b); siloxane compound e.g. polysiloxane or cyclopolysiloxane; ketone compound e.g. acetone, methyl ethyl ketone or methyl isobutyl ketone; or ester compound e.g. ethyl acetate or butyl acetate. The compositions (I) and (II) may be used in the form of aerosol. The present invention are not limited to the embodiments mentioned above.

In the above-mentioned curable fluorosilicone compositions (I) and (II), the weight ratio of the fluorosilicone compound (I) or (II) to the compound (III), i.e. the curing agent is 99/1 to 10/90, preferably 98/2 to 30/70. When an mount of the fluorosilicone compound (I) or (II) is decreased, a cured film tends to become hard and when increased, the cured film tends to become soft.

The above-mentioned curable fluorosilicone compositions (I) and (II) are used solely or in the form of blend with a proper additive or a solvent and is useful as a curable composition, for example, mold releasing agent, water- and oil-repelling agent, stain-proof coating agent, non-tackifying coating agent, coating agent for optical use, sealant or the like.

The present invention further relates to a lubricant prepared by using the fluorosilicone compounds (I) and (II) solely or by adding a proper additive or a solvent thereto.

The present invention further relates to a mold releasing agent prepared by using the curable fluorosilicone compositions (I) and (II) solely or by adding a proper additive or a solvent thereto.

Examples of the preferable fluorosilicone compound (I) for the mold releasing agent comprising the above-mentioned composition (I) are one or more of compounds represented by the formula (I-e):

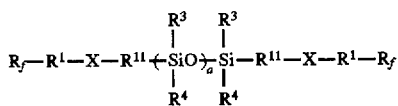

wherein $R_f$, X, $R^1$, $R^3$, $R^4$ and a are the same as above; $R^{11}$ is an alkylene group having 1 to 12 carbon atoms, an oxyalkylene group having 2 to 15 carbon atoms or a hydroxyalkylene group having 3 to 15 carbon atoms, particularly compounds represented by the formula (I-f):

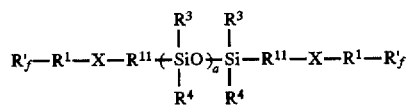

wherein $R'_f$ is a perfluoroalkyl group having 6 to 20 carbon atoms; X, $R^1$, $R^3$, $R^4$ and a are the same as above; $R^{11}$ is an alkylene group having 1 to 12 carbon atoms, an oxyalkylene group having 2 to 15 carbon atoms or a hydroxyalkylene group having 3 to 15 carbon atoms.

Examples of the preferable fluorosilicone compound (II) for the mold releasing agent comprising the above-mentioned composition (II) are one or more of compounds represented by the formula (II-e):

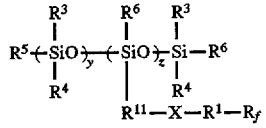

wherein $R_f$, X, $R^1$, $R^3$, $R^4$, $R^5$, $R^6$, $R^{11}$, y and z are the same as above, particularly compounds represented by the formula (II-f):

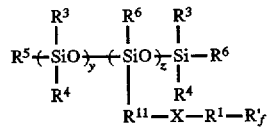

wherein X, $R^1$, $R^3$, $R^4$, $R^5$, $R^6$, $R^{11}$, y and z are the same as above, $R'_f$ is a perfluoroalkyl group having 6 to 20 carbon atoms.

Examples of the compound represented by the formula (III) which are preferable curing agents for the mold releasing agent comprising the above-mentioned composition (I) or (II) are those mentioned above.

Examples of the preferable compound represented by the above-mentioned formula (I-e) are those, in which a is 10 to 500, $R_f$ is

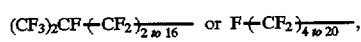

X is O or S, $R^1$ is

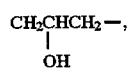

$R^3$ and $R^4$ are methyl or ethyl, $R^{11}$ is

and the like. Examples of the preferable compound represented by the formula (I-f) are those, in which X, $R^1$, $R^3$, $R^4$ and a are the same as above, $R^{11}$ is

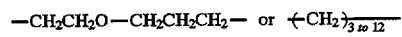

and $R'_f$ is

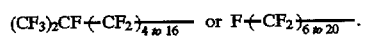

Examples of the preferable compound represented by the formula (II-e) are those, in which $R_f$, X, $R^1$, $R^3$, $R^4$ and $R^{11}$ are the same as above, y+z is 10 to 500, $R^5$ $R^6$ are methyl or ethyl and y/z is 2 to 100, and the like. Examples of the preferable compound represented by the formula (II-f) are those, in which $R'_f$, X, $R^1$, $R^3$, $R^4$, $R^5$, $R^6$, $R^{11}$, y and z are the same as above.

Examples of the preferable compound represented by the above-mentioned formula (III) are those mentioned above.

In the above-mentioned composition (I) or (II), the mixing ratio of the above-mentioned fluorosilicone compound (I) or (II) to the compound (III) is 99/1 to 20/80, preferably 98/2 to 30/70. When the fluorosilicone compound is decreased, a cured film tends to become hard, and when increased, the cured film tends to become soft.

To the above-mentioned fluorosilicone compositions (I) and (II) can be added the additives as the curing accelerator, such as a metal alkoxide such as tetraalkyl titanate, and an organic acid salt such as zinc octylate or tin octylate. The proportion of the additive, for example, the curing accelerator is from 0.2 to 20 parts (part by weight, hereinafter the same), preferably from 0.5 to 10 parts on the basis of 100 parts of the sum of the fluorosilicone compound (I) or (II) and the compound (III).

When an amount of the curing accelerator is decreased, the curing tends to be delayed, and when increased, mold releasing property tends to be poor.

Also the above-mentioned fluorosilicone compositions (I) and (II) can be used solely as the mold releasing agent, and to the compositions (I) and (II) can be added, as a diluent, a solvent such as aliphatic hydrocarbon, alicyclic hydrocarbon, aromatic hydrocarbon, halogenated hydrocarbon, siloxane compound, ketone compound, or ester compound. The proportion of the diluent when mixed to the above-mentioned compound is, for example, from 0.1 to 500 parts, preferably from 1 to 200 parts on the basis of 1 part of the composition.

When an amount of the diluent is smaller, a cured film tends to become thick due to a high viscosity, and when larger, the cured film tends to become thin due to a low viscosity.

The mold releasing agent comprising the above-mentioned composition (I) is used suitably as the mold releasing agent because of its excellent mold releasing property, maintenance of mold releasing property and non-migration property.

The mold releasing agent comprising the above-mentioned composition (II) is used suitably as the mold releasing agent because of its excellent mold releasing property, maintenance of mold releasing property and non-migration property.

The present invention further relates to a water- and oil-repelling agent prepared by using the curable fluorosilicone compositions (I) and (II) solely or by adding a proper additive or a solvent thereto.

Examples of the preferable fluorosilicone compound (I) for the water- and oil-repelling agent comprising the above-mentioned composition (I) are one or more of compounds represented by the formula (I-g):

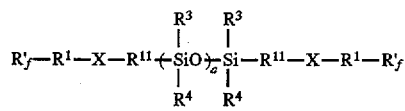

wherein $R_f$, X, $R^1$, $R^2$, $R^3$, $R^4$ and a are the same as above; $R^{11}$ is an alkylene group having 1 to 12 carbon atoms, an oxyalkylene group having 2 to 15 carbon atoms or a hydroxyalkylene group having 3 to 15 carbon atoms, particularly compounds represented by the formula (I-h):

$$R'_f-R^1-X-R^{11}+(SiO)_{\overline{a}}Si-R^{11}-X-R^1-R'_f$$

with $R^3, R^4$ substituents wherein $R'_f$ is a perfluoroalkyl group having 6 to 20 carbon atoms; X, $R^1$, $R^3$, $R^4$ and a are the same as above; $R^{11}$ is an alkylene group having 1 to 12 carbon atoms, an oxyalkylene group having 2 to 15 carbon atoms or a hydroxyalkylene group having 3 to 15 carbon atoms.

Examples of the preferable fluorosilicone compound (II) for the water- and oil-repelling agent comprising the above-mentioned composition (II) are one or more of compounds represented by the, formula (II-g):

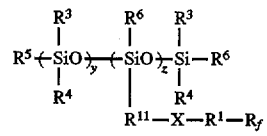

wherein $R_f$, X, $R^1$, $R^3$, $R^4$, $R^5$, $R^6$, $R^{11}$, y and z are the same as above, particularly compounds represented by the formula (II-h):

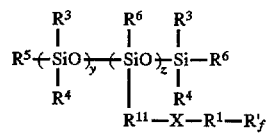

wherein X, $R^1$, $R^3$, $R^4$, $R^5$, $R^6$, $R^{11}$, y and z are the same as above, $R'_f$ is a perfluoroalkyl group having 6 to 20 carbon atoms.

Examples of the compound represented by the formula (III) which are preferable curing agents for the water- and oil-repelling agent comprising the above-mentioned composition (I) or (II) are those mentioned above.

Examples of the preferable compound represented by the above-mentioned formula (I-g) are those, in which a is 10 to 500, $R_f$ is

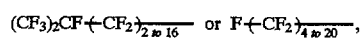

X is O or S, $R^1$ is

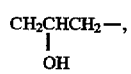

$R^3$ and $R^4$ are methyl or ethyl and $R^{11}$ is

and the like. Examples of the preferable compound represented by the formula (I-h) are those, in which $R^{11}$ is

$R'_f$ is

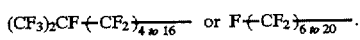

Examples of the preferable compound represented by the formula (II-g) are those, in which $R_f$, X, $R^1$, $R^3$, $R^4$ and $R^6$ are the same as above, y+z is 10 to 500, $R^5$ and $R^6$ are methyl or ethyl and y/z is 2 to 100, and the like. Examples of the preferable compound represented by the formula (II-h) are those, in which $R'_f$, X, $R^1$, $R^3$, $R^4$, $R^5$, $R^6$, $R^{11}$, y and z are the same as above.

Examples of the preferable compound represented by the above-mentioned formula (III) are those mentioned above.

In the water- and oil-repelling agent of the present invention, the mixing ratio of the above-mentioned fluorosilicone compound (I) or (II) to the compound (III) is 99/1 to 20/80, preferably 98/2 to 30/70. When an amount of the fluorosilicone compound is decreased, a cured film tends to become hard, and when increased, the cured film tends to become soft.

To the water- and oil-repelling agent of the present invention can be added the additives as the curing accelerator, such as a metal alkoxide such as tetraalkyl titanate and an organic acid salt such as zinc octylate or tin octylate. The proportion of the additive, for example, the curing accelerator is from 0.1 to 20 parts, preferably from 0.2 to 10 parts on the basis of 100 parts of the sum of the fluorosilicone compound (I) or (II) and the compound (III).

When an amount of the curing accelerator is decreased, the curing tends to be delayed, and when increased, water- and oil-repelling property tends to be poor.

Also the above-mentioned fluorosilicone composition (I) and (II) can be used solely as the water- and oil-repelling agent, and to the compositions (I) and (II) can be added, as a diluent, a solvent such as an aliphatic hydrocarbon, alicyclic hydrocarbon, aromatic hydrocarbon, halogenated hydrocarbon, siloxane compound, ketone compound, or ester compound. The proportion of the diluent when mixed to the above-mentioned compound is, for example, from 0.1 to 500 parts, preferably from 1 to 200 parts on the basis of 1 part of the composition.

When an amount of the diluent is smaller, a cured film tends to become thick due to a high viscosity, and when larger, the cured film tends to become thin due to a low viscosity.

The water- and oil-repelling agent comprising the above-mentioned composition (I) is used suitably as the water- and oil-repelling agent because of its excellent water- and oil-repelling property.

The water- and oil-repelling agent comprising the above-mentioned composition (II) is used suitably as the water- and oil-repelling agent because of its excellent water- and oil-repelling property.

The present invention further relates to a stain-proof coating agent prepared by using the curable fluorosilicone compositions (I) and (II) solely or by adding a proper additive or a solvent thereto.

Examples of the preferable fluorosilicone compound (I) for the stain-proof coating agent comprising the above-mentioned composition (I) are one or more of compounds represented by the formula (I-i):

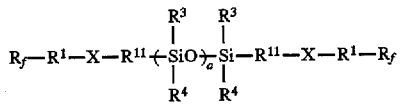

wherein $R_f$, X, $R^1$, $R^2$, $R^3$, $R^4$ and a are the same as above; $R^{11}$ is an alkylene group having 1 to 12 carbon atoms, an oxyalkylene group having 2 to 15 carbon atoms or a hydroxyalkylene group having 3 to 15 carbon atoms, particularly compounds represented by the formula (I-j):

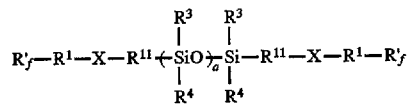

wherein $R'_f$ is a perfluoroalkyl group having 6 to 20 carbon atoms; X, $R^1$, $R^3$, $R^4$ and a are the same as above; $R^{11}$ is an alkylene group having 1 to 12 carbon atoms, an oxyalkylene group having 2 to 15 carbon atoms or a hydroxyalkylene group having 3 to 15 carbon atoms.

Examples of the preferable fluorosilicone compound (II) for the stain-proof coating agent comprising the above-mentioned composition (II) are one or more of compounds represented by the formula (II-i):

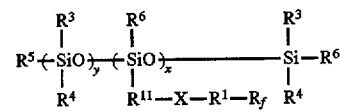

wherein $R_f$, X, $R^1$, $R^3$, $R^4$, $R^5$, $R^6$, $R^{11}$, y and z are the same as above, particularly compounds represented by the formula (II-j):

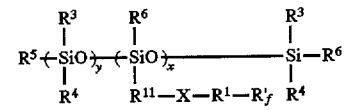

wherein X, $R^1$, $R^3$, $R^4$, $R^5$, $R^6$, $R^{11}$, y and z are the same as above, $R'_f$ is a perfluoroalkyl group having 6 to 20 carbon atoms.

Examples of the compound represented by the formula (III) which are preferable curing agents for the stain-proof coating comprising the agent above-mentioned composition (I) or (II) are those mentioned above.

Examples of the preferable compound represented by the above-mentioned formula (I-i) are those, in which a is 10 to 500, $R_f$ is

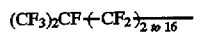

or

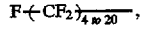,

X is O or S, $R^1$ is

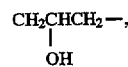

$R^3$ and $R^4$ are methyl or ethyl, $R^{11}$ is $$-CH_2CH_2O-CH_2CH_2CH_2-$$

or

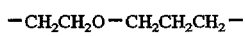

and the like. Examples of the preferable compound represented by the formula (I-j) are those, in which $R^{11}$ is $$-CH_2CH_2O-CH_2CH_2CH_2-$$

or

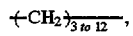

and $R'_f$ is

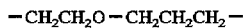

or

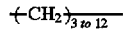

Examples of the preferable compound represented by the formula (II-i) are those, in which $R_f$, X, $R^1$, $R^3$, $R^4$ and $R^{11}$ are the same as above, y+z is 10 to 500, $R^5$ and $R^6$ are methyl or ethyl and y/z is 2 to 100, and the like. Examples of the preferable compound represented by the formula (115) are those, in which $R'_f$, X, $R^1$, $R^3$, $R^4$, $R^5$, $R^6$, $R^{11}$, y and z are the same as above.

Examples of the preferable compound represented by the above-mentioned formula (III) are those mentioned above.

In the stain-proof coating agent of the present invention, the mixing ratio of the above-mentioned fluorosilicone compound (I) or (II) to the compound (III) is 99/1 to 20/80, preferably 98/2 to 30/70. When an amount of the fluorosilicone compound is smaller, a cured film tends to become hard, and when larger, the cured film tends to become soft.

To the stain-proof coating agent of the present invention can be added additives such as a curing accelerator, colorant, filler, ultraviolet ray absorber and electric conductivity imparting agent. The proportion of the additives on the basis of 100 parts of the sum of the fluorosilicone compound (I) or (II) and the compound (III) is, for example, 0.1 to 20 parts, in preferably 0.2 to 10 parts in case of the curing accelerator and 0.1 to 10 parts case of the ultraviolet ray absorber. The adding amounts of the filler, colorant and electric conductivity imparting agent can be selected optionally in a wide range depending on application.

When an adding amount of any one of the above-mentioned additives is smaller, its effect tends to be lowered, and when the amounts of the additives are too much, stain-proof property tends to be lowered.

The above-mentioned fluorosilicone compositions (I) and (II) can be used solely as the stain-proof coating agent. To the compositions (I) and (II) can be added, as a diluent, a solvent such as an aliphatic hydrocarbon, alicylic hydrocarbon, aromatic hydrocarbon, halogenated hydrocarbon, siloxane compound, ketone compound or ester compound. The proportion of the diluent when mixed to the compound is, for example, from 0.1 to 500 parts, preferably from 1 to 200 parts on the basis of 1 part of the above-mentioned composition.

When an amount of the above-mentioned diluent is smaller, a cured film tends to become thick due to a high viscosity, and when larger, the cured film tends to become thin due to a low viscosity.

The stain-proof coating agent comprising the above-mentioned composition (I) is used suitably as the stain-proof coating agent because of its excellent stain-proof property and water- and oil-repelling property.

The stain-proof coating agent comprising the above-mentioned composition (II) is used suitably as the stain-proof coating agent because of its excellent stain-proof property and water- and oil-repelling property.

The present invention further relates to a non-tackifying coating agent prepared by using the curable fluorosilicone compositions (I) and (II) solely or by adding a proper additive or a solvent thereto.

Examples of the preferable fluorosilicone compound (I) for the non-tackifying coating agent comprising the above-mentioned composition (I) are one or more of compounds represented by the formula (I-k):

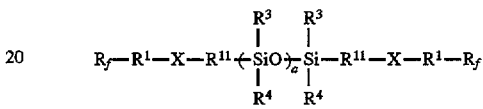

wherein $R_f$, X, $R^1$, $R^3$, $R^4$ and a are the same as above; $R^{11}$ is an alkylene group having 1 to 21 carbon atoms, an oxyalkylene group having 2 to 15 carbon atoms or a hydroxyalkylene group having 3 to 15 carbon atoms, particularly compounds represented by the formula (I-1):

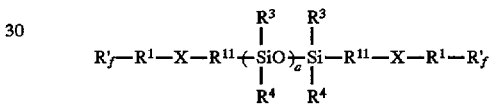

wherein $R'_f$ is a perfluoroalkyl group having 6 to 20 carbon atoms; X, $R^1$, $R^3$, $R^4$ and a are the same as above; $R^{11}$ is an alkylene group having 1 to 12 carbon atoms, an oxyalkylene group having 2 to 15 carbon atoms or a hydroxyalkylene group having 3 to 15 carbon atoms.

Examples of the preferable fluorosilicone compound (II) for the non-tackifying coating agent comprising the above-mentioned composition (II) are one or more of compounds represented by the formula (II-k):

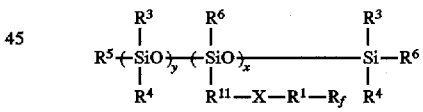

wherein $R_f$, X, $R^1$, $R^3$, $R^4$, $R^5$, $R^6$, $R^{11}$, y and z are the same as above, particularly compounds represented by the formula (II-1):

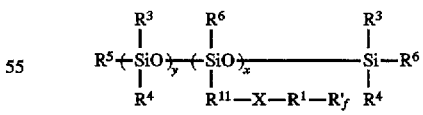

wherein X, $R^1$, $R^3$, $R^4$, $R^5$, $R^6$ $R^{11}$, y and z are the same as above, $R'_f$ is a perfluoroalkyl group having 6 to 20 carbon atoms.

Examples of the compound represented by the formula (III) which are preferable curing agents for the non-tackifying coating agent comprising the above-mentioned composition (I) or (II) are those mentioned above.

Examples of the preferable compound represented by the above-mentioned formula (I-k) are those, in which a is 10 to 500, $R_f$ is

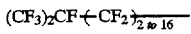

or

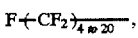

X is O or S, $R^1$ is $$CH_2CHCH_2- \atop | \atop OH$$

$R^3$ and $R^4$ are methyl or ethyl and $R^{11}$ is $$-CH_2CH_2O-CH_2CH_2CH_2-$$

or

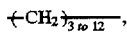

and the like. Examples of the preferable compound represented by the formula (I-l) are those, in which X, $R^1$, $R^3$, $R^4$ and a are the same as above, $R^{11}$ is $$-CH_2CH_2O-CH_2CH_2CH_2-$$

or $+CH_2\!\!\!\!\!\!\!\!\!\!\!\!\!\!\!\!\overline{\phantom{aa}}_{3\,to\,12}$ and $R'_f$ is

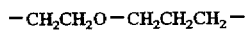

or

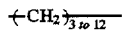

Examples of the preferable compound represented by the formula (II-k) are those, in which $R_f$, X, $R^1$, $R^3$, $R^4$ and $R^{11}$ are the same as above, y+z is 10 to 500, $R^5$ and $R^6$ are methyl or ethyl and y/z is 2 to 100, and the like. Examples of the preferable compound represented by the formula (II-l) are those, in which $R'_f$, X, $R^1$, $R^3$, $R^4$, $R^5$, $R^6$, $R^{11}$, y and z are the same as above.

Examples of the preferable compound represented by the above-mentioned formula (III) are those mentioned above.

In the non-tackifying coating agent, the mixing ratio of the above-mentioned fluorosilicone compound (I) or (II) to the compound (III) is 99/1 to 20/80, preferably 98/2 to 30/70. When an amount of the fluorosilicone compound is smaller, a cured film tends to become hard, and when larger, the cured film tends to become soft.

To the above-mentioned fluorosilicone compositions (I) and (II) can be added additives such as a curing accelerator, colorant, filler, ultraviolet ray absorber and electric conductivity imparting agent. The proportion of the additives when mixed to the compound on the basis of 100 parts of the sum of the fluorosilicone compound (I) or (II) and the compound (III) is, for example, 0. 1 to 20 parts, preferably 0.2 to 10 parts, in case of the curing accelerator and 0.1 to 10 parts in case of the ultraviolet ray absorber. The adding mounts of the filler, colorant and electric conductivity imparting agent can be selected optionally in a wide range depending on application.

When an adding amount of any one of the above-mentioned additives is smaller, its effect tends to be lowered, and when the amounts of the additives are too much, non-tackifying property tends to be lowered.

The above-mentioned fluorosilicone compositions (I) and (II) can be used solely as the non-tackifying coating agent. To the compositions (I) and (II) can be added, as a diluent, a solvent such as an aliphatic hydrocarbon, alicyclic hydrocarbon, aromatic hydrocarbon, halogensted hydrocarbon, siloxane compound, ketone compound or ester compound. The proportion of the diluent when mixed to the compound is, for example, from 0.1 to 500 parts, preferably from 1 to 200 parts on the basis of 1 part of the above-mentioned composition.

When an amount of the above-mentioned diluent is smaller, a cured film tends to become thick due to a high viscosity, and when larger, the cured film tends to become thin due to a low viscosity.

The non-tackifying coating agent comprising the above-mentioned composition (I) is used suitably as the non-tackifying coating agent because of its excellent mold releasing property and non-tackifying property.

The non-tackifying coating agent comprising the above-mentioned composition (II) is used suitably as the non-tackifying coating agent because of its excellent mold releasing property and non-tackifying property.

The present invention further relates to a coating agent for optical use prepared by using the curable fluorosilicone compositions (I) and (II) solely or by adding a proper additive or a solvent thereto.

Examples of the preferable fluorosilicone compound (I) for the coating agent for optical use comprising the above-mentioned composition (I) are one or more of compounds represented by the formula (I-m):

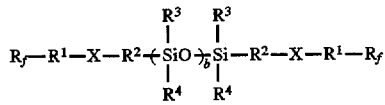

wherein $R_f$, X, $R^1$, $R^2$, $R^3$ and $R^4$ are the same as above, b is an integer of 5 to 10 0, particularly compounds represented by the formula (I-n):

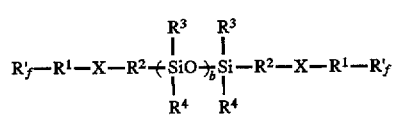

wherein $R'_f$ is a perfluoroalkyl group having 6 to 20 carbon atoms, X, $R^1$, $R^2$, $R^3$, $R^4$ and b are the same as above.

Examples of the preferable fluorosilicone compound (II) for the coating agent for optical use comprising the above-mentioned composition (II) are one or more of compounds represented by the formula (II-m):

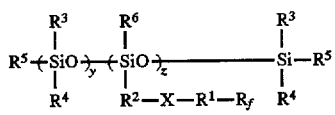

wherein y+z is 5 to 100, y/z is 0.5 to 100, others are the same as above, particularly compounds represented by the formula (II-n):

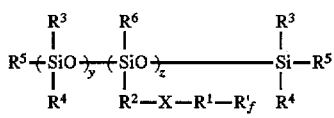

wherein y+z is 5 to 1,000, y/z is 0.5 to 100, $R'_f$ is a perfluoroalkyl group having 6 to 20 carbon atoms, others are the same as above.

Examples of the compounds represented by the formula (III) which are preferable curing agents for the coating agent for optical use comprising the above-mentioned composition (I) or (II) are those mentioned above.

Examples of the preferable compound represented by the above-mentioned formula (I-m) are those, in which $R_f$ is

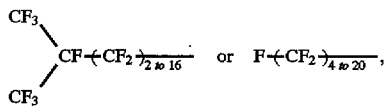

X is O, S, —NH— or —$CO_2$—, $R^1$ is

—$CH_2CHCH_2$—,
   |
   OH $R^2$ is

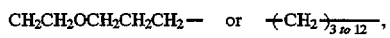

$R^3$ and $R^4$ are $CH_3$, b is an integer of 5 to 100, and the like. Examples of the preferable compound represented by the formula (I-n) are those, in which $R'_f$ is

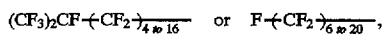

others are the same as above, and the like.

Examples of the preferable compound represented by the formula (II-m) are those, in which $R_f$ is

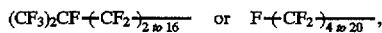

X is O, S, —NH— or —$CO_2$—, $R^1$ is

—$CH_2CHCH_2$—,
   |
   OH $R^2$ is

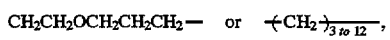

$R^3$, $R^4$, $R^5$ and $R^6$ are $CH_3$, y+z is 5 to 1,000, y/z is 0.5 to 100, and the like. Examples of the preferable compound represented by the formula (II-n) are those, in which $R'_f$ is

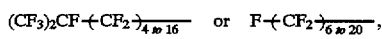

others are the same as above, and the like.

Examples of the preferable compound represented by the above-mentioned formula (III) are those mentioned above.

In the coating agent for optical use of the present invention, the mixing ratio of the above-mentioned fluorosilicone compound (I) or (II) to the compound (III) is 99/1 to 20/80, preferably 98/2 to 30/70. When an amount of the fluorosilicone compound is smaller, hardness and refractive index of the cured film tend to be high, and when larger, hardness and refractive index of the cured film tend to be low.

To the above-mentioned coating agent for optical use can be added the additives as the curing accelerator, such as a metal alkoxide such as tetraalkyl titanate and an organic acid salt such as zinc octylate or tin octylate. The proportion of the additive, for example, the curing accelerator is from 0.1 to 20 parts, preferably from 0.2 to 10 parts on the basis of 100 parts of the sum of the fluorosilicone compound (I) or (II) and the compound (III).

When an amount of the curing accelerator is smaller, the curing tends to be delayed, and when larger, transparency and storage stability tend to be lowered.

Also the above-mentioned fluorosilicone compositions (I) and (II) can be used solely as the coating agent for optical use, and to the compositions (I) and (II) can be added, as a diluent, a solvent such as an aliphatic hydrocarbon, alicyclic hydrocarbon, aromatic hydrocarbon, halogenated hydrocarbon, siloxane compound, ketone compound, or ester compound. The proportion of the diluent when mixed to the above-mentioned compound is, for example, from 0.1 to 500 parts, preferably from 1 to 200 parts on the basis of 1 part of the composition.

When an mount of the diluent is smaller, a cured film tends to become thick due to a high viscosity, and when larger, the cured film tends to become thin due to a low viscosity.

The coating agent for optical use comprising the above-mentioned composition (I) is used suitably as the coating agent for optical use because of its low refractive index and excellent transparency.

The above-mentioned composition containing the compound (II) has a low refractive index and is excellent in transparency, and is used suitably for the coating agent for optical use.

The present invention relates to the sealant prepared by using the curable fluorosilicone compositions (I) and (II) solely or by adding a proper additive or a solvent thereto.

Examples of the preferable fluorosilicone compound (I) for the sealant comprising the above-mentioned composition (I) are one or more of compounds represented by the formula (I-o):

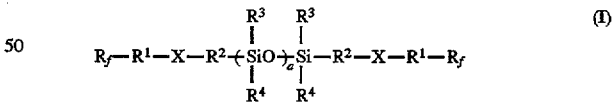

wherein $R_f$, X, $R^1$, $R^2$, $R^3$, $R^4$ and a are the same as above, particularly compounds represented by the formula (I-p):

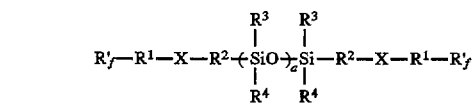

wherein $R'_f$ is a perfluoroalkyl group having 6 to 20 carbon atoms; X, $R^1$, $R^2$, $R^3$, $R^4$ and a are the same as above.

Examples of the preferable fluorosilicone compound (II) for the sealant comprising the above-mentioned composition (II) are one or more of compounds represented by the formula (II-o):

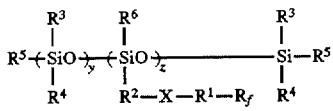

(II)

wherein $R_f$, X, $R^1$, $R^2$, $R^3$, $R^4$, $R^5$, $R^6$, y and z are the same as above, particularly compounds represented by the formula (II-p):

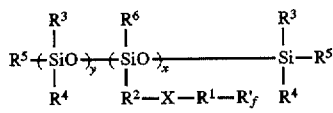

wherein X, $R^1$, $R^2$, $R^3$, $R^4$, $R^5$, $R^6$, y and z are the same as above, $R'_f$ is a perfluoroalkyl group having 6 to 20 carbon atoms.

Examples of the compound represented by the formula (III) which are preferable curing agents for the sealant comprising the above-mentioned composition (I) or (II) are those mentioned above.

Examples of the preferable compound represented by the above-mentioned formula (I-o) are those, in which $R_f$ is

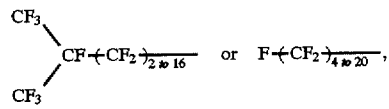

X is O, S, —NH— or —CO$_2$—, $R^1$ is

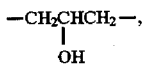

$R^2$ is

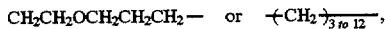

$R^3$ and $R^4$ are CH$_3$, a is an integer of 5 to 1,000, the like. Examples of the preferable compound represented by the formula (I-p) are those, in which $R_f$ is

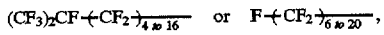

others are the same as above, and the like.

Examples of the preferable compounds represented by the formula (II-o) are those, in which $R_f$ is

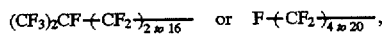

X is O, S, —NH— or —CO$_2$—, $R^1$ is

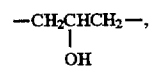

$R^2$ is

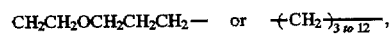

$R^3$, $R^4$, $R^5$ and $R^6$ are CH$_3$, y+z is 5 to 1,000, y/z is 0.5 to 100, and the like. Examples of the preferable compound represented by the formula (II-p) are those, in which $R'_f$ is

others are the same as above, and the like.

Examples of the preferable compound represented by the above-mentioned formula (III) are those mentioned above.

In the sealant of the present invention, the mixing ratio of the above-mentioned fluorosilicone compound (I) or (II) to the compound (III) is 99/1 to 20/80, preferably 98/2 to 30/70. When the fluorosilicone compound is decreased, a cured film tends to become hard, and when increased, the cured film tends to become soft.

To the sealant of the present invention can be added additives such as a curing accelerator, colorant, filler, ultraviolet ray absorber and electric conductivity imparting agent. The proportion of the additives when mixed to the compound on the basis of 100 parts of the sum of the fluorosilicone compound (I) or (II) and the compound (III) is, for example, 0.1 to 20 parts, preferably 0.2 to 10 parts, in case of the curing accelerator and 0.1 to 10 parts in case of the ultraviolet ray absorber. The adding amounts of the filler, colorant and electric conductivity imparting agent can be selected optionally in a wide range depending on applications.

When an adding mount of any one of the above-mentioned additives is smaller, its effect tends to be lowered, and when the amounts of the additives are too much, curability, water- and oil-repelling property and stain-proof property tend to be lowered.

The sealant comprising the above-mentioned composition (I) is used suitably as the sealant because of its excellent curability, sealing property, water- and oil-repelling property and stain-proof property.

The sealant comprising the above-mentioned composition (II) is used suitably as the sealant because of its excellent curability, sealing property, water- and oil-repelling property and stain-proof property.

The fluorosilicone compound of the present invention and the composition of the present invention containing that compound are then explained concretely with Examples, and the present invention is not limited to Examples.

EXAMPLE 1

A 300 ml four-necked flask equipped with a Dimroth condenser tube, thermometer, nitrogen gas introducing tube and dropping funnel was charged with 40 g of

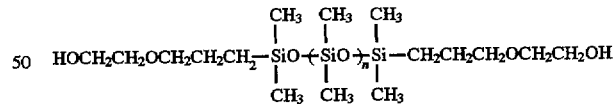

(Average value of n = 22)

(available from Shin-Etsu Silicone Kabushiki Kaisha, tradename: Alcohol-modified silicone oil KF-6001), and 100 mg of chloroform was added, followed by replacement of the system with nitrogen gas.

After adding 0.5 ml of BF$_3$ diethyl etherate, perfluoroisononylpropylene oxide

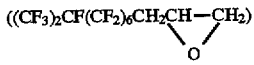

(23.1 g (44 mmol)) was added dropwise slowly through the dropping funnel with heating and refluxing. After heating and stirring for 18 hours, disappearance of the above-mentioned oxide was confirmed with gas chromatography, followed by rinsing with 1N-HCl solution and an aqueous solution of 10% sodium hydrocarbonate, drying with $MgSO_4$, filtrating and condensing the filtrate under reduced pressure to give 57 g of a colorless oily product (yield was 90%).

With respect to the product obtained in Example 1, the data obtained through $^1H$ and $^{19}F$ nuclear magnetic resonance absorption method (NMR) ( available from Bruker Kabushiki Kaisha, tradename: AC-300; analytical conditions, resonance frequency: 300 MHz, reference peak of $^1H$: tetramethylsilane, reference peak of $^{19}F$: fluorotrichloromethane, solvent: $CDCl_3$) and the chemical structure of the product identified by using that data are shown below.

$^1HNMR$

δ0.01s(152H)i,

δ0.55m(4H)h, δ1.63m(4H)g,

δ4.25s(2H)j,

δ3.3–3.8 m(18H)b, c, d, e, f,

δ2.3m(4H)a $^{19}FNMR$

−73 ppm(6F)a,

−118.5 ppm(2F)h,

−116 ppm—124.5 ppm(10F)c, d, e, f, g,

−187 ppm(1F)b $$R_f-\overset{a}{C}H_2\overset{b}{C}H\overset{c}{C}H_2\overset{d}{O}\overset{e}{C}H_2\overset{f}{C}H_2\overset{g}{O}-\overset{h}{C}H_2CH_2CH_2\overset{\overset{CH_3}{|}}{Si}\overset{\overset{CH_3}{|}}{O}(\overset{\overset{CH_3}{|}}{Si}O)_n\overset{\overset{CH_3}{|}}{Si}-$$
$$\underset{\underset{j}{OH}}{|}$$

$$-CH_2CH_2CH_2OCH_2CH_2O-CH_2\overset{h}{C}H\overset{g}{C}H_2\overset{f}{R_f}$$
$$\underset{\underset{j}{OH}}{|}$$

$$R_f = (CF_3)_2\overset{a}{C}F\overset{b}{C}F_2\overset{c}{C}F_2\overset{d}{C}F_2\overset{e}{C}F_2\overset{f}{C}F_2\overset{g}{C}F_2\overset{h}{C}F_2 -$$

EXAMPLE 2

The same procedures as in Example 1 were repeated except that 20.9 g of $$F-(CF_2CF_2)_4CH_2CH-CH_2$$
$$\diagdown O \diagup$$

was used instead of 23.1 g of $$(CF_3)_2CF(CF_2)_6CH_2CH-CH_2$$
$$\diagdown O \diagup$$

to obtain 54.6 g of a colorless oily product (yield was 90%).

With respect to the product obtained in Example 2, the data obtained through NMR in the same manner as in Example 1 and the chemical structure of the product identified with that data are shown below.

The data of $^1HNMR$ was the same as those of Example 1.

$^{19}FNMR$

−81.4 ppm(3F)a, −110.7—113.6 ppm (2F)h, −12 1.0 ppm—123.1 ppm (10F)c, d, e, f, g, −125.5 ppm (2F)b $$R_fCH_2CHCH_2OCH_2CH_2OCH_2CH_2CH_2\overset{\overset{CH_3}{|}}{Si}O(\overset{\overset{CH_3}{|}}{Si}O)_n$$
$$\underset{OH}{|} \qquad \underset{CH_3}{|} \quad \underset{CH_3}{|}$$

$$-\overset{\overset{CH_3}{|}}{Si}CH_2CH_2CH_2OCH_2CH_2OCH_2CHCH_2R_f$$
$$\underset{CH_3}{|} \qquad \qquad \underset{OH}{|}$$

$$R_f = \overset{a}{C}F_3\overset{b}{C}F_2\overset{c}{C}F_2\overset{d}{C}F_2\overset{e}{C}F_2\overset{f}{C}F_2\overset{g}{C}F_2\overset{h}{C}F_2 -$$

EXAMPLE 3

A 100 ml four-necked flask equipped with a Dimroth condenser tube, thermometer, nitrogen gas introducing tube and dropping funnel was charged with 25 g of $$HOCH_2CH_2OCH_2CH_2CH_2-\overset{\overset{CH_3}{|}}{Si}O(\overset{\overset{CH_3}{|}}{Si}O)_n\overset{\overset{CH_3}{|}}{Si}-CH_2CH_2CH_2OCH_2CH_2OH$$
$$\underset{CH_3}{|} \quad \underset{CH_3}{|} \quad \underset{CH_3}{|}$$

(Averzge value of n = 74)

(available from Shin-Etsu Silicone Kabushiki Kaisha, tradename: Alcohol-modified silicone oil KF-6003), and 50 ml of chloroform was added, followed by replacement of the system with nitrogen gas.

After adding 0.5 ml of $BF_3$ diethyl etherate, 8.6 g of perfluoroisononylpropylene oxide $$((CF_3)_2CF(CF_2)_6CH_2CH-CH_2)$$
$$\diagdown O \diagup$$

was added dropwise slowly through the dropping funnel with heating and refluxing. After heating and stirring for 18 hours, disappearance of the above-mentioned oxide was confirmed with gas chromatography, followed by rinsing with water, drying with $MgSO_4$, filtrating and condensing the filtrate under reduced pressure to give 29.5 g of a colorless oily product (yield was 96%).

With respect to the product obtained in Example 3, the data obtained through NMR in the same manner as in Example 1 and the chemical structure of the product identified with that data are shown below.

$^1HNMR$

δ0.01s(458H)i, δ0.55m(4H)h,

δ1.63m(4H)g,

δ4.25s(2H)j,

δ3.3–3.8m(18H)b, c, d, e, f,

δ2.3m(4H)a $^{12}FNMR$

−73 ppm(6 F) a, −113.5 ppm(2 F) h,

−116 ppm—124.5 ppm(10F)c, d, e, f, g,

−187 ppm(1F)b $$R_f-\overset{a}{C}H_2\overset{b}{C}H\overset{c}{C}H_2\overset{d}{O}\overset{e}{C}H_2CH_2O-CH_2CH_2CH_2\overset{\overset{CH_3}{|}}{Si}O(\overset{\overset{CH_3}{|}}{Si}O)_n\overset{\overset{CH_3}{|}}{Si}-$$
$$\underset{\underset{j}{OH}}{|} \qquad \qquad \underset{CH_3}{|} \quad \underset{CH_3}{|} \quad \underset{CH_3}{|}$$

-continued $$-CH_2CH_2CH_2OCH_2CH_2O-\underset{\underset{OH}{|}}{\overset{c}{C}H_2}\overset{b}{C}H\overset{a}{C}H_2R_f$$
$$\phantom{-CH_2CH_2CH_2OCH_2CH_2}\overset{h}{\phantom{C}}\phantom{H_2}\overset{g}{\phantom{C}}\phantom{H_2}\overset{f}{\phantom{O}}\phantom{CH}\overset{e}{\phantom{_2}}\phantom{CH_2}\overset{d}{\phantom{O}}$$

$$R_f = (\overset{a}{C}F_3)_2\overset{b}{C}F\overset{c}{C}F_2\overset{d}{C}F_2\overset{e}{C}F_2\overset{f}{C}F_2\overset{g}{C}F_2\overset{h}{C}F_2-$$

EXAMPLE 4

A 100 me four-necked flask equipped with a Dimroth condenser tube, thermometer, nitrogen gas introducing tube and dropping funnel was charged with 12.6 g of $$H(OCH_2CH_2)_k-OCH_2CH_2CH_2-\underset{\underset{CH_3}{|}}{\overset{\overset{CH_3}{|}}{Si}}O\underset{\underset{CH_3}{|}}{\overset{\overset{CH_3}{|}}{(-SiO-)_m}}\underset{\underset{CH_3}{|}}{\overset{\overset{CH_3}{|}}{Si}}-CH_2CH_2CH_2O(CH_2CH_2O)_n-H \quad (m=15, k+n=30)$$

(available from Toray Dow Corning Co., Ltd., tradename: Alcohol-modified silicone oil SF8427), and 50 ml of chloroform was added, followed by replacement of the system with nitrogen gas.

After adding 0. 5 ml of BF$_3$ diethyl etherate, 6.3 g of perfluoroisononylpropylene oxide $$((CF_3)_2CF(CF_2)_6CH_2CH-CH_2)$$
$$\phantom{((CF_3)_2CF(CF_2)_6CH_2CH}\underset{O}{\diagdown\diagup}$$

was added dropwise slowly through the dropping funnel with heating and refluxing. After heating and stirring for 4 hours, disappearance of the above-mentioned oxide was confirmed with gas chromatography, followed by rinsing with water, drying with MgSO$_4$, filtrating and condensing the filtrate under reduced pressure to give 18.1 g of a light brown oily product (yield was 96%).

With respect to the product obtained in Example 4, the data obtained through NMR in the same manner as in Example 1 and the chemical structure of the product identified with that data are shown below.

$^1$HNMR

δ0.0s(103H)i, δ0.45m(4H)h,

δ1.52m(4H)g,

δ3.3–3.7brs(130H)b, c, d, e, f, δ2.3m(4H)a $^{19}$FNMR

−73 ppm(6F) a, −113.5 ppm(2F)h,

−116 ppm—124.5 ppm(10F)c, d, e, f, g,

−187 ppm(1F)b $$R_f-\overset{a}{C}H_2\overset{b}{C}H\overset{c}{C}H_2-(-O\overset{d}{C}H_2\overset{e}{C}H_2-)_{\overline{z}}O\overset{f}{C}H_2\overset{g}{C}H_2\overset{h}{C}H_2(\underset{\underset{CH_3}{|}}{\overset{\overset{i}{C}H_3}{|}}{SiO})_m$$
$$\phantom{R_f-C}\underset{OH}{|}$$

$$-\underset{\underset{CH_3}{|}}{\overset{\overset{CH_3}{|}}{Si}}CH_2CH_2CH_2O-(-CH_2CH_2O-)_nCH_2\overset{}{C}H\overset{}{C}H_2R_f$$
$$\phantom{-SiCH_2CH_2CH_2O-CH_2CH_2O}\underset{OH}{|}$$

$$R_f=(\overset{a}{C}F_3)_2\overset{b}{C}F\overset{c}{C}F_2\overset{d}{C}F_2\overset{e}{C}F_2\overset{f}{C}F_2\overset{g}{C}F_2\overset{h}{C}F_2-$$

EXAMPLE 5

A 200 ml four-necked flask equipped with Dimroth condenser tube, thermometer, nitrogen gas introducing tube and dropping funnel was charged with 4.3 g of perfluoroalkyl ethyl alcohol (CF$_3$CF$_3$(CF$_2$CF$_2$)$_n$CH$_2$CH$_2$OH (n=3 to 7, average value of n=3.77), which was dissolved by adding 50 ml of dichloromethane and 50 ml of HCFC225, followed by replacement of the system with nitrogen gas.

After adding 0.5 ml of BF$_3$ diethyl etherate, dichloromethane (50 ml) solution of $$(CH_3)_3SiO\underset{\underset{CH_3}{|}}{\overset{\overset{CH_3}{|}}{(-SiO-)_y}}\underset{\underset{CH_2CH_2CH_2OCH_2CHCH_2}{|}}{\overset{\overset{CH_3}{|}}{(-SiO-)_z}}Si(CH_3)_3$$
$$\phantom{(CH_3)_3SiO-SiO-SiO-Si(CH_3)_3CH_2CH_2CH_2OCH_2}\underset{O}{\diagdown\diagup}$$

(available from Toray Dow Corning Co., Ltd., tradename: Epoxy-modified silicone oil SF 84 13) (30.6 g) was added dropwise slowly through the dropping funnel with heating and refluxing. After heating and stirring for 4 hours, disappearance of the fluorine-containing alcohol was confirmed with gas chromatography, followed by rinsing with water, drying with MgS$_4$, flitrating and condensing the filtrate under reduced pressure to give 31.3 g of a milk-white oily product (yield was 90%).

With respect to the product obtained in Example 5, the data obtained through NMR in the same manner as in Example 1 and the chemical structure of the product identified with that data are shown below.

$^1$HNMR

δ0.05s(332H)a, δ0.45m(2H)b,

δ1.55m(2H)a, δ2.3m(2H)i,

δ3.2–3.8m(9H)d, e, f, g, h, $^{19}$FNMR

−82 ppm(3F)a, −111 ppm—114 ppm(2F)e,

−118—124 ppm(13F)c, d, −126 ppm(2F)b $$(\overset{a}{C}H_3)_3SiO\underset{\underset{CH_3}{|}}{\overset{\overset{\overset{a}{C}H_3}{|}}{(-SiO-)_y}}\underset{\underset{CH_2CH_2CH_2OCH_2CHCH_2OCH_2CH_2R_f}{|}}{\overset{\overset{\overset{a}{C}H_3}{|}}{(-SiO-)_z}}Si(\overset{a}{C}H_3)_3$$
$$\phantom{xxxxxxxxxxxxxxxxxxxxxxxx}\underset{OH}{|}$$
$$\phantom{xxxxxxxxxxxxxxxxxxxxxxxxxxxxxx}\underset{j}{}$$

$$R_f=\overset{a}{C}F_3\overset{b}{C}F_2-(-\overset{c}{C}F_2\overset{c}{C}F_2-)_{\overline{2.77}}\overset{d}{C}F_2\overset{e}{C}F_2-$$

EXAMPLE 6

A 100 ml four-necked flask equipped with a Dimroth condenser tube, thermometer, nitrogen gas introducing tube and dropping funnel was charged with 33 g of

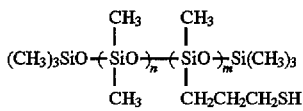

(available from Toray Dow Corning Co., Ltd., tradename: Mercapto-modified silicone oil BY16-838A), and 50 ml of chloroform was added, followed by replacement of the system with nitrogen gas.

After adding 0.5 ml of BF$_3$ diethyl etherate, 6.3 g of perfluoroisononylpropylene oxide

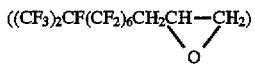

was added dropwise slowly through the dropping funnel with heating and refluxing. After heating and stirring for 1.5 hours, disappearance of the above-mentioned oxide was confirmed with gas chromatography, followed by rinsing with water, drying with MgSO$_4$, flitrating and condensing the filtrate under reduced pressure to give 38 g of colorless oily product (yield was 97%).

With respect to the product obtained in Example 6, the data obtained through NMR in the same manner as in Example 1 and the chemical structure of the product identified with that data are shown below.

$^1$HNMR

δ8 0.01s(300H)a, δ8 0.65m(2H)b,

δ1.67m(2H)c, 8 2.3m(2H)g,

δ2.4–2.6m(4H)d, e, δ3.4–3.6(1H)f $^{19}$FNMR

−73 ppm(6F)a, −113.5 ppm(2F)h,

−116ppm—125 ppm(10F)c, d, e, f, g,

−187 ppm(1F)b

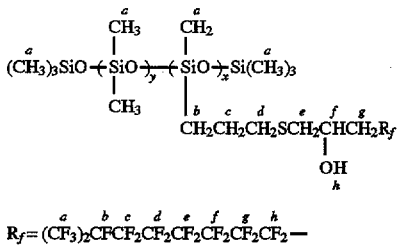

EXAMPLE 7

A 100 ml four-necked flask equipped with a Dimroth condenser tube, thermometer, nitrogen gas introducing tube and dropping funnel was charged with 7 g of

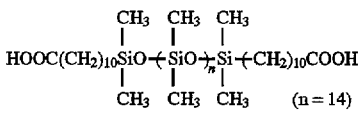

(available from Toray Dow Corning Co., Ltd., tradename: Carboxyl-modified silicone oil BY16 -750), and 20 ml of chloroform was added, followed by replacement of the system with nitrogen gas.

After adding 0.5 mg of BF3 diethyl etherate, 6.3 g of perfluoroisononylpropylene oxide

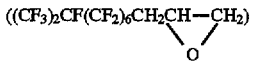

was added dropwise slowly through the dropping funnel with heating and refluxing. After heating and stirring for 4 hours, disappearance of the above-mentioned oxide was confirmed with gas chromatography, followed by rinsing with water, drying with MgSO$_4$, filtrating and condensing the filtrate under reduced pressure to give 10 g of light-brown oily product (yield was 75%).

With respect to the product obtained in Example 7, the data obtained through NMR in the same manner as in Example i and the chemical structure of the product identified with that data are shown below.

$^1$HNMR

δ0.01s(96H)h, δ0.55m(4H)g,

δ1.3–1.5 brs(32H)e, f,

δ2.3–2.4m(SH)a, d, δ3.5 m(2H)b,

δ4.1 m(4H)c $^{19}$FNMR

−73 ppm(6F)a, −113.5 ppm(2F)h,

−116 ppm—124.5 ppm(10F)c, d, e, f, g,

−187 ppm(1F)b

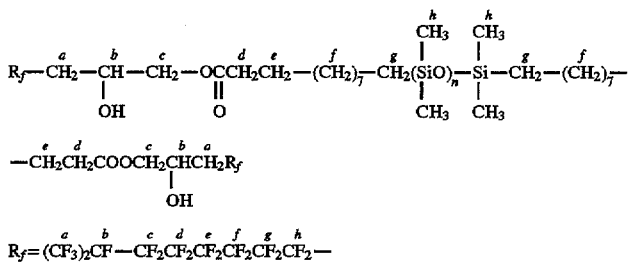

REFERENCE EXAMPLE 1

The same procedures as in Example 1 were repeated except that 7.7 g of

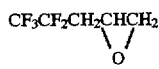

was used instead of 23.1 g of

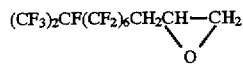

to obtain 43.9 g of a colorless oily product (yield was 92%).

With respect to the product obtained in Reference Example 1, the data obtained through NMR in the same manner as in Example 1 and the chemical structure of the product identified with that data are shown below.

$^1$HNMR

δ0.01s(152H)i, δ0.55m(4H)h,
δ1.63m(4H)g, δ4.25s(2H)j,
δ3.3–3.5m(18H)b, c, d, e, f,
δ2.3m(4H)a

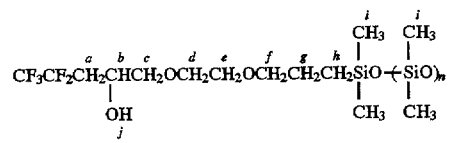

-continued

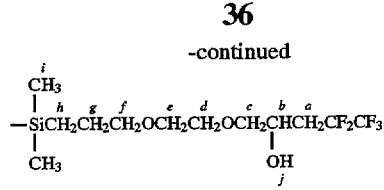

EXAMPLE 8

The compound obtained in Example 1 as a component (A), a curing agent

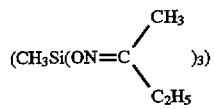

as a component (B) and a curing accelerator (tin octylate) as a component (C) were mixed homogeneously at a mixing ratio shown in Table 1 to give a curable fluorosilicone composition of the present invention for a mold releasing agent, water- and oil-repelling agent, stain-proof coating agent and non-tackifying coating agent.

The obtained composition was brush-coated on an aluminium plate of 7 cm×15 cm and on the inner surface of an aluminium die having inner dimensions of 6cmø×1 cm, followed by heating at 150° C. for 20 minutes and curing to give a test piece.

The obtained test piece was evaluated by the test methods mentioned below. The results are shown in Table 2.

TABLE 1

| Ex. No. | Component (A) (novel compound) Compound | % | Component (B) (curing agent) Compound | % | Component (C) (curing accelerator) Compound | % |
|---|---|---|---|---|---|---|
| 8 | Compound obtained in Ex. 1 | 85 | CH$_3$Si(ON=C(CH$_3$)(C$_2$H$_5$))$_3$ | 10 | Tin octylate | 5 |
| 9 | Compound obtained in Ex. 1 | 75 | " | 25 | None | — |
| 10 | Compound obtained in Ex. 1 | 75 | " | 20 | Tetrabutyl titanate | 5 |
| 11 | Compound obtained in Ex. 1 | 75 | " | 20 | Tin octylate | 5 |
| 12 | Compound obtained in Ex. 1 | 75 | " | 20 | " | 5 |
| 13 | Compound obtained in Ex. 1 | 55 | " | 40 | " | 5 |
| 14 | Compound obtained in Ex. 1 | 75 | CH$_3$Si(OCH$_3$)$_3$ | 20 | Tetrabutyl titanate | 5 |
| 15 | Compound obtained in Ex. 1 | 75 | C$_8$F$_{17}$CH$_2$CH$_2$Si(OCH$_3$)$_3$ | 20 | " | 5 |
| 16 | Compound obtained in Ex. 2 | 75 | CH$_3$Si(ON=C(CH$_3$)(C$_2$H$_5$))$_3$ | 20 | Tin octylate | 5 |
| 17 | Compound obtained in Ex. 2 | 75 | CH$_3$Si(OCCH$_3$)$_3$ (O=) | 20 | " | 5 |

| Ex. No. | Total percentage of three components (%) | Solvent | Percentage of solvent (%) | Curing conditions °C. | minutes | Coating thickness (μm) |
|---|---|---|---|---|---|---|
| 8 | 100 | — | — | 150 | 20 | 10 |
| 9 | 100 | — | — | 200 | 60 | 12 |
| 10 | 100 | — | — | 150 | 20 | 15 |

TABLE 1-continued

| | | | | | | |
|---|---|---|---|---|---|---|
| 11 | 100 | — | — | 150 | 20 | 13 |
| 12 | 10 | Octamethylcyclosiloxane | 90 | 80 | 90 | 3 |
| 13 | 100 | — | — | 150 | 20 | 11 |
| 14 | 100 | — | — | 150 | 45 | 12 |
| 15 | 100 | — | — | 150 | 30 | 18 |
| 16 | 100 | — | — | 150 | 20 | 9 |
| 17 | 100 | — | — | 150 | 20 | 10 |

TABLE 2

| Ex. No. | Contact Angle H$_2$O | Contact Angle n-Hexadecane | Refractive index | Transparency | Compatibility (composition including a solvent) | Appearance of coated film (curability) | Mold-releasing property | Finished surface of molded article |
|---|---|---|---|---|---|---|---|---|
| 8  | 117 | 71 | 1.390 | Transparent | Compatible uniformly | Good | A | A |
| 9  | 115 | 69 | 1.394 | Transparent | Compatible uniformly | Good | A | A |
| 10 | 116 | 70 | 1.393 | Transparent | Compatible uniformly | Good | A | A |
| 11 | 116 | 71 | 1.392 | Transparent | Compatible uniformly | Good | A | A |
| 12 | 115 | 70 | 1.392 | Transparent | Compatible uniformly | Good | A | A |
| 13 | 112 | 69 | 1.405 | Transparent | Compatible uniformly | Good | A | A |
| 14 | 115 | 70 | 1.392 | Transparent | Compatible uniformly | Good | A | A |
| 15 | 120 | 72 | 1.378 | Transparent | Compatible uniformly | Good | A | A |
| 16 | 117 | 70 | 1.393 | Transparent | Compatible uniformly | Good | A | A |
| 17 | 117 | 70 | 1.393 | Transparent | Compatible uniformly | Good | A | A |

The tests were conducted in the manner mentioned below.

Measurement of contact angle: The contact angle was measured through sessile drop method by using a contact angle meter (available from Kyowa Kaimen Kagaku Kabushiki Kaisha), and an average value of five droplets was taken as a contact angle.

Mold releasing test (mold releasing property of a mold releasing agent): The mold releasing agent was brush-coated on the inner surface of an aluminium die having inner dimensions of 6 cmø×1 cm, and the die was heated at 150° C. for 20 minutes to cure the composition and form a cured film on the inner surface of the die.

A urethane composition comprising the following components was fully stirred and poured into the die.

Sannix FA 912[1)] 100 parts

Ethylene glycol 19 parts

R-11 trichloromonofluoromethane 5 parts

DABCO (1,4-diazabicyclo[2,22]octane) 0.9 part

Dibutyltindilaurate 0.025 part

Millionate MTL[2)] 104 parts

The component 1) is a polyol available from Sanyo Kasei Kabushiki Kaisha, and the component 2) is an isocyanate available from Nippon Polyurethane Kabushiki Kaisha.

After producing a urethane molded article by curing at room temperature for 10 minutes, a pin which had been stood in the urethane previously during the molding was pulled by means of a tension tester (at a rate of 20 mm/min) to measure a tensile force (g/cm$^2$). Mold releasing property was evaluated under the following criteria.

A: Not more than 100 g/cm$^2$

B: More than 100 g/cm$^2$ and not more than 200 g/cm$^2$

C: More than 200 g/cm$^2$ and not more than 300 g/cm$^2$

D: More than 300 g/cm$^2$

Finishing test (Finished surface of molded article): The urethane molded article released from the die in the mold releasing test was checked to observe the finished surface thereof with naked eyes, which was evaluated according to the following criteria.

A: Finished surface is good.

B: There are partly pin holes on the surface.

C: There are pin holes wholly on the surface.

EXAMPLE 9

The compound obtained in Example 1 as the component (A) and a curing agent

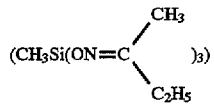

as the component (B) were mixed homogeneously at a mixing ratio shown in Table 1 to give the curable fluorosilicone composition of the present invention for a mold releasing agent, water- and oil-repelling agent, stain-proof coating agent and non-tackifying coating agent.

The obtained composition was coated on the aluminium plate and the aluminium die in the same manner as in Example 8 and subjected to curing under the curing conditions (temperature, time) shown in Table 1 to give a test piece.

By using the obtained test pieces, the same tests as in Example 8 were carried out. The results are shown in Table 2.

EXAMPLE 10

The compound obtained in Example 1 as the component (A), ) as a curing agent

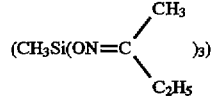

as the component (B) and a curing accelerator (tetrabutyl titanate) as the component (C) were mixed homogeneously at a mixing ratio shown in Table 1 to give the curable fluorosilicone composition of the present invention for a mold releasing agent, water- and oil-repelling agent, stain-proof coating agent and non-tackifying coating agent.

The obtained composition was coated on the aluminium plate and aluminium die in the same manner as in Example 8 and subjected to curing under the curing conditions shown in Table 1 to give a test piece. By using the obtained test piece, the same tests as in Example 8 were carried out. The results are shown in Table 2.

EXAMPLE 11

The compound obtained in Example 1 as the component (A), a curing agent

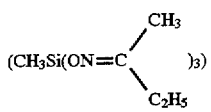

as the component (B) and a curing accelerator (tin octylate) as the component (C) were mixed homogeneously at a mixing ratio shown in Table 1 to give the curable fluorosilicone composition of the present invention for a mold releasing agent, water- and oil-repelling agent, stain-proof coating agent and non-tackifying coating agent.

The obtained composition was subjected to curing under the curing conditions shown in Table 1 in the same manner as in Example 8 to give a test piece. By using the obtained test piece, the same tests as in Example 8 were carried out. The results are shown in Table 2.

EXAMPLE 12

The compound obtained in Example 1 as the component (A), a curing agent

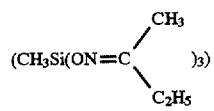

as the component (B) and a curing accelerator (tin octylate) and a solvent (octamethylcyclosiloxane) as the components (C) were mixed homogeneously at a mixing ratio shown in Table 1 to give the curable fluorosilicone composition of the present invention for a mold releasing agent, water- and oil-repelling agent, stain-proof coating agent and non-tackifying coating agent.

The obtained composition was subjected to curing under the curing conditions shown in Table 1 in the same manner as in Example 9 to give a test piece. By using the obtained test piece, the same tests as in Example 1 were carried out. The results are shown in Table 2.

EXAMPLE 13

The compound obtained in Example 1 as the component (A), a curing agent

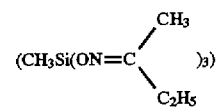

as the component (B) and a curing accelerator (tin octylate) as the component (C) were mixed homogeneously at a mixing ratio shown in Table 1 to give the curable fluorosilicone composition of the present invention for a mold releasing agent, water- and oil-repelling agent, stain-proof coating agent and non-tackifying coating agent.

The obtained composition was subjected to curing under the curing conditions shown in Table 1 in the same manner as in Example 8 to give a test piece. By using the obtained test piece, the same tests as in Example 8 were carried out. The results are shown in Table 2.

EXAMPLE 14

The compound obtained in Example 1 as the component (A), a curing agent ($CH_3Si(OCH_3)_3$) as the component (B) and a curing accelerator (tetrabutyl titanate) as the component (C) were mixed homogeneously at a mixing ratio shown in Table 1 to give the curable fluorosilicone 6oreposition of the present invention for a mold releasing agent, water- and oil-repelling agent, stain-proof coating agent and non-tackifying coating agent.

The obtained composition was subjected to curing under the curing conditions shown in Table 1 in the same manner as in Example 8 to give a test piece. By using the obtained test piece, the same tests as in Example 8 were carried out. The results are shown in Table 2.

EXAMPLE 15

The compound obtained in Example 1 as the component (A), a curing agent ($C_8F_{17}CH_2CH_2Si(OCH_3)_3$ as the component (B) and a curing accelerator (tetrabutyl titanate). as the component (C) were mixed homogeneously at a mixing ratio shown in Table 1 to give the curable fluorosilicone composition of the present invention for a mold releasing agent, water- and oil-repelling agent, stain-proof coating agent and non-tackifying coating agent.

The obtained composition was subjected to curing under the curing conditions shown in Table 1 in the same manner as in Example 8 to give a test piece. By using the obtained test piece, the same tests as in Example 8 were carried out. The results are shown in Table 2.

EXAMPLE 16

The compound obtained in Example 2 as the component (A), a curing agent

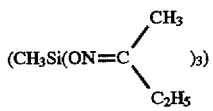

as the component (B) and a curing accelerator (tin octylate) as the component (C) were mixed homogeneously at a mixing ratio shown in Table 1 to give the curable fluorosilicone composition of the present invention for a mold releasing agent, water- and oil-repelling agent, stain-proof coating agent and non-tackifying coating agent.

The obtained composition was subjected to curing under the curing conditions shown in Table 1 in the same manner as in Example 8 to give a test piece. By using the obtained test piece, the same tests as in Example 8 were carried out. The results are shown in Table 2.

EXAMPLE 17

The compound obtained in Example 2 as the component (A), a curing agent

as the component (B) and a curing accelerator (tin octylate) as the component (C) were mixed homogeneously at a mixing ratio shown in Table 1 to give the curable fluorosilicone composition of the present invention for a mold releasing agent, water- and oil-repelling agent, stain-proof coating agent and non-tackifying coating agent.

The obtained composition was subjected to curing under the curing conditions shown in Table 1 in the same manner as in Example 8 to give a test piece. By using the obtained test piece, the same tests as in Example 8 were carried out. The results are shown in Table 2.

COMPARATIVE EXAMPLE 1

The compound prepared in Example 1 as the component (A), a curing agent

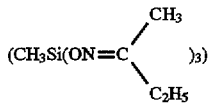

as the component (B) and a curing accelerator (tin octylate) as the component (C) were mixed homogeneously at a mixing ratio shown in Table 3 to give a curable fluorosilicone composition for a mold releasing agent, water- and oil-repelling agent, stain-proof coating agent and non-tackifying coating agent.

The obtained composition was subjected to curing under the curing conditions shown in Table 3 in the same manner as in Example 8 to give a test piece. By using the obtained test piece, the same tests as in Example 8 were carried out. The results are shown in Table 4.

COMPARATIVE EXAMPLE 2

The compound prepared in Example 1 as the component (A), a curing agent

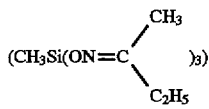

as the component (B) and a curing accelerator (tin octylate) as the component (C) were mixed homogeneously at a mixing ratio shown in Table 8 to give a curable fluorosilicone composition for a mold releasing agent, water- and oil-repelling agent, stain-proof coating agent and non-tackifying coating agent.

The obtained composition was subjected to curing under the curing conditions shown in Table 8 in the same manner as in Example 8 to give a test piece. By using the obtained test piece, the same tests as in Example 8 were carried out. The results are shown in Table 4.

COMPARATIVE EXAMPLE 3

Polydimethylsiloxane

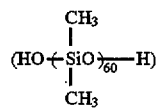

having a hydroxyl group on its end as the component (A), a curing agent, i.e. $CH_3Si(OCH_3)_3$ as the component (B) and a curing accelerator (tin octylate) as the component (C) were mixed homogeneously at a mixing ratio shown in Table 3 to give a curable fluorosilicone composition for a mold releasing agent, water- and oil-repelling agent, stain-proof coating agent and non-tackifying coating agent.

The obtained composition was subjected to curing under the curing conditions shown in Table 3 in the same manner as in Example 8 to give a test piece. By using the obtained test piece, the same tests as in Example 8 were carried out. The results are shown in Table 4.

COMPARATIVE EXAMPLE 4

Polydimethylsiloxane

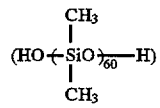

having a hydroxyl group on its end as the component (A), a curing agent ($C_8F_{17}CH_2CH_2Si(OCH_3)_3$) as the component (B) and a curing accelerator (tin octylate) as the component (C) were mixed homogeneously at a mixing ratio shown in Table 3 to give a curable fluorosilicone composition for a mold releasing agent, water- and oil-repelling agent, stain-proof coating agent and non-tackifying coating agent.

The obtained composition was subjected to curing under the curing conditions shown in Table 3 in the same manner as in Example 8 to give a test piece. By using the obtained test piece, the same tests as in Example 1 were carried out. The results are shown in Table 4.

COMPARATIVE EXAMPLE 5

Polydimethylsiloxane

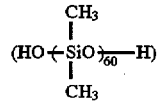

having a hydroxyl group on its end as the component (A), a curing agent ($C_8F_{17}CH_2CH_2Si(OCH_3)_3$) as the component (B) and a curing accelerator (tin octylate) and a solvent (HCFC-225) as the components (C) were mixed homogeneously at a mixing ratio shown in Table 3 to give a curable fluorosilicone composition for a mold releasing agent, water- and oil-repelling agent, stain-proof coating agent and non-tackifying coating agent.

The obtained composition was subjected to curing under the curing conditions shown in Table 3 in the same manner as in Example 8 to give a test piece. By using the obtained test piece, the same tests as in Example 8 were carried out. The results are shown in Table 4.

COMPARATIVE EXAMPLE 6

Polydimethylsiloxane

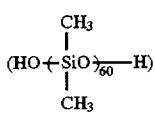

having a hydroxyl group on its end as the component (A), a curing agent ($C_8F_{17}CH_2CH_2Si(OCH_3)_3$) as the component (B) and a curing accelerator (tin octylate) and a solvent (HCFC-225) as the components (C) were mixed homogeneously at a mixing ratio shown in Table 3 to give a curable fluorosilicone composition for a mold releasing agent, water- and oil-repelling agent, stain-proof coating agent and non-tackifying coating agent.

The obtained composition was subjected to curing under the curing conditions shown in Table 3 in the same manner as in Example 8 to give a test piece. By using the obtained test piece, the same tests as in Example 8 were carried out. The results are shown in Table 4.

COMPARATIVE EXAMPLE 7

Polydimethylsiloxane

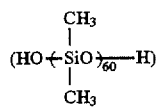

having a hydroxyl group on its end as the component (A), curing agents ($C_8F_{17}CH_2CH_2Si(OCH_3)_3$ and $CH_3Si(OCH_3)_3$) as the components (B) and a curing accelerator (tin octylate) as the component (C) were mixed homogeneously at a mixing ratio shown in Table 3 to give a curable fluorosilicone composition for a mold releasing agent, water- and oil-repelling agent, stain-proof coating agent and non-tackifying coating agent.

The obtained composition was subjected to curing under the curing conditions shown in Table 3 in the same manner as in Example 8 to give a test piece. By using the obtained test piece, the same tests as in Example 8 were carried out. The results are shown in Table 4.

COMPARATIVE EXAMPLE 8

Polydimethylsiloxane

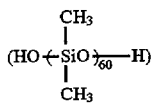

having a hydroxyl group on its end as the component (A), a curing agent ($CF_3CH_2CH_2Si(OCH_3)_3$) as the component (B) and a curing accelerator (tin octylate) as the component (C) were mixed homogeneously at a mixing ratio shown in Table 3 to give a curable fluorosilicone composition for a mold releasing agent, water- and oil-repelling agent, stain-proof coating agent and non-tackifying coating agent.

The obtained composition was subjected to curing under the curing conditions shown in Table 3 in the same manner as in Example 8 to give a test piece. By using the obtained test piece, the same tests as in Example 8 were carried out. The results are shown in Table 4.

COMPARATIVE EXAMPLE 9

The compound prepared in Reference Example 1 as the component (A), a curing agent, i.e. $CH_3Si(OCH_3)_3$ as the component (B) and a curing accelerator (tin octylate) as the component (C) were mixed homogeneously at a mixing ratio shown in Table 3 to give a curable fluorosilicone composition for a mold releasing agent, water- and oil-repelling agent, stain-proof coating agent and non-tackifying coating agent.

The obtained composition was subjected to curing under the curing conditions shown in Table 3 in the same manner as in Example 8 to give a test piece. By using the obtained test piece, the same tests as in Example 8 were carried out. The results are shown in Table 4.

TABLE 3

| Com. Ex. No. | Component (A) (novel compound) Compound | % | Component (B) (curing agent) Compound | % | Component (C) (curing accelerator) Compound | % |
|---|---|---|---|---|---|---|
| 1 | Compound obtained in Ex. 1 | 94.5 | $CH_3Si(ON=C(CH_3)(C_2H_5))_3$ | 0.5 | Tin octylate | 5 |
| 2 | " | 5 | " | 90 | " | 5 |
| 3 | $HO{+}SiO{\}_n{-}H$ (N=60) with $CH_3$ groups | 75 | $CH_3Si(OCH_3)_3$ | 20 | " | 5 |
| 4 | " | 75 | $C_8F_{17}CH_2CH_2Si(OCH_3)_3$ | 20 | " | 5 |
| 5 | " | 75 | " | 20 | " | 5 |
| 6 | " | 55 | " | 40 | " | 5 |
| 7 | " | 55 | " / $CH_3Si(OCH_3)_3$ | 20 / 20 | " | 5 |
| 8 | " | 75 | $CF_3CH_2CH_2Si(OCH_3)_3$ | 20 | " | 5 |
| 9 | Compound obtained in Ref. Ex. 1 | 75 | $CH_3Si(OCH_3)_3$ | 20 | " | 5 |

TABLE 3-continued

| Ex. No. | Total percentage of three components (%) | Solvent | Percentage of solvent (%) | Curing conditions °C. | Curing conditions minutes | Coating thickness (μm) |
|---|---|---|---|---|---|---|
| 1 | 100 | — | — | 150 | 30 | 12 |
| 2 | 100 | — | — | 150 | 20 | 13 |
| 3 | 100 | — | — | 150 | 20 | 17 |
| 4 | 100 | — | — | 150 | 45 | 10 |
| 5 | 10 | HCFC-225 | 90 | 150 | 45 | 5 |
| 6 | 10 | " | 90 | 150 | 45 | 2 |
| 7 | 100 | — | — | 150 | 45 | 10 |
| 8 | 100 | — | — | 150 | 45 | 11 |
| 9 | 100 | — | — | 150 | 20 | 15 |

TABLE 4

| Com. Ex. No. | Contact Angle $H_2O$ | Contact Angle n-Hexadecane | Refractive index | Transparency | Compatibility (composition including a solvent) | Appearance of coated film (curability) | Mold-releasing property | Finished surface of molded article |
|---|---|---|---|---|---|---|---|---|
| 1 | 105 | 72 | 1.386 | Good | Uniform | Insufficient | A | C |
| 2 | 102 | 58 | 1.425 | Good | Uniform | Good | B | A |
| 3 | 96 | 44 | 1.418 | Good | Uniform | Good | B | A |
| 4 | 78 | 64 | — | Turbid in white | Separated into two layers | Nonuniform due to insufficient curing | B | C |
| 5 | 78 | 63 | — | Turbid in white | Uniform | Nonuniform due to insufficient curing | B | C |
| 6 | 85 | 68 | — | Turbid in white | Uniform | Nonuniform due to insufficient curing | B | C |
| 7 | 93 | 55 | — | Turbid in white | Separated into two layers | Nonuniform due to insufficient curing | B | C |
| 8 | 106 | 60 | — | Good | Uniform | Good | B | A |
| 9 | 98 | 52 | 1.415 | Good | Uniform | Good | B | B |

INDUSTRIAL APPLICABILITY

The present invention is to provide a novel fluorosilicone compound which can give a novel curable composition being excellent in compatibility with a general-purpose curing agent.

Also the above-mentioned compound is suitably used for a lubricant and a fiber treating agent, and the curable composition comprising the above-mentioned compound and a general purpose curing agent is used suitably for a mold releasing agent, stain-proof coating agent, non-tackifying coating agent, coating agent for optical use and sealant.

We claim:

1. A fluorosilicone compound having at least two hydroxyl groups in its molecule and represented by the formula (I):

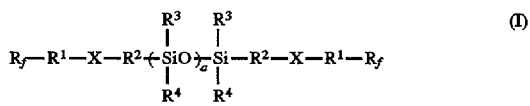

wherein $R_f$ is a perfluoroalkyl group having 4 to 20 carbon atoms or a perfluoroalkyl group having 4 to 20 carbon atoms in which a part of the fluorine atoms are replaced by chlorine atom, hydrogen atom or both; $R^1$ is an alkylene group having 1 to 5 carbon atoms or a hydroxyalkylene group having 2 to 5 carbon atoms; $R^2$ is an alkylene group having 1 to 12 carbon atoms, an oxyalkylene group having 2 to 50 carbon atoms or a hydroxyalkylene group having 3 to 15 carbon atoms; $R^3$ and $R^4$ are the same or different and each is at least one of an alkyl having 1 to 4 carbon atoms, phenyl or a fluoroalkyl group having 1 to 3 carbon atoms; X is oxygen atom, sulfur atom, NH or $CO_2$; a is an integer of 5 to 1,000; provided that at least one of $R^1$ or $R^2$ is said hydroxyalkylene group.

2. A fluorosilicone compound represented by the formula (II):

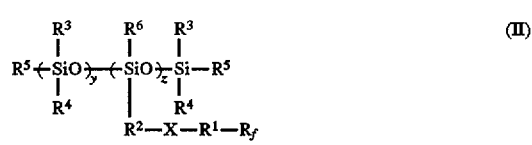

wherein $R_f$ is a perfluoroalkyl group having 4 to 20 carbon atoms or a perfluoroalkyl group having 4 to 20 carbon atoms in which a part of the fluorine atoms are replaced by chlorine atom, hydrogen atom or both; $R^1$ is an alkylene group having 1 to 5 carbon atoms or a hydroxyalkylene group having 2 to 5 carbon atoms; $R^2$ is an alkylene group having 1 to 12 carbon atoms, an oxyalkylene group having 2 to 50 carbon atoms or a hydroxyalkylene group having 3 to 15 carbon atoms; $R^3$, $R^4$, $R^5$ and $R^6$ are the same or different and each is at least one of an alkyl having 1 to 4 carbon atoms, phenyl or a fluoroalkyl group having 1 to 3 carbon atoms; X is oxygen atom, sulfur atom, NH or $CO_2$; both of y and z are an integer, the sum of them is an integer of 5 to 1,000 and y/z is in the range of 0.5 to 200; provided that z is not less than 2 and at least one of $R^1$ or $R^2$ is said hydroxyalkylene group.

3. A curable fluorosilicone composition containing one or more of fluorosilicone compounds having at least two hydroxyl groups in its molecule and represented by the formula (I):

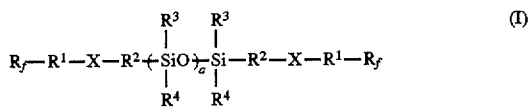

wherein $R_f$ is a perfluoroalkyl group having 4 to 20 carbon atoms or a perfluoroalkyl group having 4 to 20 carbon atoms in which a part of the fluorine atoms are replaced by chlorine atom, hydrogen atom or both; $R^1$ is an alkylene group having 1 to 5 carbon atoms or a hydroxyalkylene group having 2 to 5 carbon atoms; $R^2$ is an alkylene group having 1 to 12 carbon atoms, an oxyalkylene group having 2 to 50 carbon atoms or a hydroxyalkylene group having 3 to 15 carbon atoms; $R^3$ and $R^4$ are the same or different and each is at least one of an alkyl having 1 to 4 carbon atoms, phenyl or a fluoroalkyl group having 1 to 3 carbon atoms; X is oxygen atom, sulfur atom, NH or $CO_2$; a is an integer of 5 to 1,000; provided that at least one of $R^1$ or $R^2$ is said hydroxyalkylene group, and one or more of the compounds represented by the formula (III):

wherein $R^7$ is an alkyl, a fluoroalkyl group, an alkenyl or phenyl, a is 0 or 1, Z is at least one of halogen atom, an alkoxyl group, an acyloxyl group, a ketoxime group, an alkenyloxy group, an amino group or an amido group.

4. A curable fluorosilicone composition comprising one or more of the fluorosilicone compounds having at least two hydroxyl groups in its molecule and represented by the formula (II):

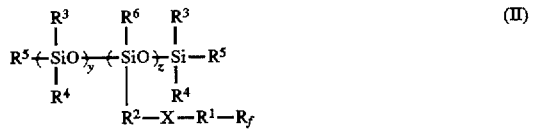

wherein $R_f$ is a perfluoroalkyl group having 4 to 20 carbon atoms or a perfluoroalkyl group having 4 to 20 carbon atoms in which a part of the fluorine atoms are replaced by chlorine atom, hydrogen atom or both; $R^1$ is an alkylene group having 1 to 5 carbon atoms or a hydroxyalkylene group having 2 to 5 carbon atoms; $R^2$ is an alkylene group having 1 to 12 carbon atoms, an oxyalkylene group having 2 to 50 carbon atoms or a hydroxyalkylene group having 3 to 15 carbon atoms; $R^3$, $R^4$, $R^5$ and $R^6$ are the same or different and each is at least one of an alkyl having 1 to 4 carbon atoms or a fluoroalkyl group having 1 to 3 carbon atoms; X is oxygen atom, sulfur atom, NH or $CO_2$; both y and z are an integer, the sum of them is an integer of 5 to 1,000 and y/z is in the range of 0.5 to 200; provided that z is not less than 2 and at least one of $R^1$ or $R^2$ is said hydroxyalkylene group, and one or more of the compounds represented by the formula (III):

wherein $R^7$ is an alkyl, a fluoroalkyl group, an alkenyl or phenyl, a is 0 or 1, Z is halogen atom, an alkoxyl group, an acyloxyl group, a ketoxime group, an alkenyloxy group, an amino group or an amido group.

5. A lubricant comprising the fluorosilicone compound of claim 1.

6. A fiber treating agent comprising the fluorosilicone compound of claim 1.

7. A mold releasing agent comprising the curable fluorosilicone composition of claim 3.

8. A water- and oil-repelling agent comprising the curable fluorosilicone composition of claim 3.

9. A stain-proof coating agent comprising the curable fluorosilicone composition of claim 3.

10. A non-tackifying coating agent comprising the curable fluorosilicone composition of claim 3.

11. A coating agent for optical use comprising the curable fluorosilicone composition of claim 3.

12. A sealant comprising the curable fluorosilicone composition of claim 3.

13. A lubricant comprising the fluorosilicone compound of claim 2.

14. A fiber treating agent comprising the fluorosilicone compound of claim 2.

15. A mold releasing agent comprising the curable fluorosilicone composition of claim 4.

16. A water- and oil-repelling agent comprising the curable fluorosilicone composition of claim 4.

17. A stain-proof coating agent comprising the curable fluorosilicone composition of claim 4.

18. A non-tackifying coating agent comprising the curable fluorosilicone composition of claim 4.

19. A coating agent for optical use comprising the curable fluorosilicone composition of claim 4.

20. A sealant comprising the curable fluorosilicone composition of claim 4.

* * * * *